US012729103B2

(12) United States Patent
Jenkins et al.

(10) Patent No.: US 12,729,103 B2
(45) Date of Patent: Sep. 8, 2026

(54) AUTOMATIC GAS PUMP ASSISTANCE DEVICE

(71) Applicant: J&J Engineering LLC, Columbia, MD (US)

(72) Inventors: Michael H. Jenkins, Columbia, MD (US); Kyle E. Jones, Columbia, MD (US)

(73) Assignee: J&J Engineering LLC, Columbia, MD (US)

( * ) Notice: Subject to any disclaimer, the term of this patent is extended or adjusted under 35 U.S.C. 154(b) by 0 days.

(21) Appl. No.: 19/193,949

(22) Filed: Apr. 29, 2025

(65) Prior Publication Data

US 2025/0340429 A1 Nov. 6, 2025

Related U.S. Application Data

(60) Provisional application No. 63/641,513, filed on May 2, 2024.

(51) Int. Cl.
*B67D 7/42* (2010.01)

(52) U.S. Cl.
CPC .................................... *B67D 7/42* (2013.01)

(58) Field of Classification Search
CPC ........................................................ B67D 7/42
USPC .................................................. 141/192, 392
See application file for complete search history.

(56) References Cited

U.S. PATENT DOCUMENTS 3,928,739 A 12/1975 Miyamae
4,095,629 A 6/1978 Jordan
4,175,595 A 11/1979 Noe
4,200,128 A 4/1980 Pokrzywa
4,201,253 A 5/1980 Maloney
4,210,181 A 7/1980 Clevenger
4,245,682 A 1/1981 Agnew, Sr.
4,275,776 A 6/1981 Rehkopf
4,278,116 A 7/1981 Opp
4,287,736 A 9/1981 Hadgis
4,334,560 A 6/1982 Lockwood
4,337,917 A 7/1982 Spector
4,349,177 A 9/1982 Shimada et al.
4,389,550 A 6/1983 Reiter
4,636,601 A 1/1987 Tanabe (Continued)

FOREIGN PATENT DOCUMENTS

FR 2861383 A1 4/2005
GB 2263754 A 8/1993

(Continued)

*Primary Examiner* — Christopher M Afful
(74) *Attorney, Agent, or Firm* — Rahman LLC

(57) ABSTRACT

An automatic gas pump assistance device includes a housing containing electronic components, including batteries, a servo motor, a PCB board, a charging port, an on-off switch, and a gearset. The device also includes a first button acting as a lever to actuate a smaller, second button inside the housing. A cam is driven by the servo motor via the gearset, engaging with the gas pump when actuated. The device also includes a back cover restricting the device's rotation about an axle connected to the cam, thus ensuring attachment to the gas pump without slipping. The device further includes a PCB board utilizing a microcontroller to command the servo motor to switch between preset positions based on the button state.

20 Claims, 27 Drawing Sheets

(56) References Cited

U.S. PATENT DOCUMENTS

| | | | | |
|---|---|---|---|---|
| 4,683,923 | A | 8/1987 | Harris | |
| 4,690,182 | A | 9/1987 | Knaus | |
| 4,722,375 | A | 2/1988 | Fox | |
| 4,758,694 | A | 7/1988 | Burdick | |
| 4,846,447 | A | 7/1989 | Hanna | |
| 5,040,769 | A * | 8/1991 | Wilber | G05G 5/04 251/293 |
| 5,118,074 | A | 6/1992 | Weissman | |
| 5,199,474 | A | 4/1993 | D'Angelo | |
| 5,469,900 | A | 11/1995 | Weeks et al. | |
| 5,517,732 | A | 5/1996 | Crear | |
| 5,645,115 | A | 7/1997 | Kesterman et al. | |
| 6,031,196 | A | 2/2000 | Johnston | |
| 6,087,954 | A | 7/2000 | McSpadden et al. | |
| 6,095,173 | A | 8/2000 | Perry | |
| 6,220,092 | B1 | 4/2001 | Catbagan | |
| 6,227,266 | B1 | 5/2001 | Moore et al. | |
| 6,279,621 | B1 | 8/2001 | Gelsomino | |
| 6,418,988 | B1 | 7/2002 | Palumbo et al. | |
| 6,832,636 | B2 * | 12/2004 | Harrison | C07K 14/47 251/234 |
| 7,040,361 | B2 | 5/2006 | Soussan et al. | |
| 8,905,093 | B2 | 12/2014 | Cloud et al. | |
| 10,689,244 | B1 * | 6/2020 | LeCroix | B67D 7/42 |
| 11,148,931 | B1 * | 10/2021 | Bolden | B67D 7/42 |
| 2003/0056617 | A1 | 3/2003 | Harrison | |
| 2004/0226628 | A1 | 11/2004 | Henry | |
| 2006/0185765 | A1 | 8/2006 | Bates | |
| 2007/0012844 | A1 | 1/2007 | Goldman | |
| 2009/0048945 | A1 | 2/2009 | DeLine | |
| 2010/0175786 | A1 | 7/2010 | Martin | |
| 2013/0327440 | A1 | 12/2013 | Kincaid | |
| 2014/0069550 | A1 | 3/2014 | Stiler | |
| 2014/0096868 | A1 | 4/2014 | Garrison et al. | |
| 2014/0261885 | A1 | 9/2014 | Sefjack | |
| 2015/0191343 | A1 | 7/2015 | Powers | |
| 2018/0168419 | A1 | 6/2018 | Johnson et al. | |
| 2020/0122998 | A1 | 4/2020 | Stumpf | |
| 2021/0017014 | A1 | 1/2021 | Mouser | |
| 2023/0278855 | A1 | 9/2023 | Lucas et al. | |

FOREIGN PATENT DOCUMENTS

| | | | |
|---|---|---|---|
| GB | 2390666 | A | 1/2004 |
| GB | 2532059 | A | 5/2016 |
| GB | 2591629 | A | 8/2021 |

* cited by examiner

SECTION F-F

SECTION G-G

SECTION H-H

SECTION J-J

SECTION I-I

SECTION K-K

SECTION A-A
A
A
2
25a
25b
25a, 25b
26a
26b
26a, 26b
27a
27b
27a, 27b
28
29
30
31
32
33
34
35a
35b
35c
35d
36a
36b
37a
37b
38
39

4x
46
64
49b
48
49a
3x
42a
49a
43x
41a
45
49d
44
47
48
49b
42b
78
46
49c
41b
40
42a
77a
41a
44
48
41a
45
97
44
4x
47
43x
78
90
41b

SECTION B-B

SECTION C-C

SECTION D-D

DETAIL E

AUTOMATIC GAS PUMP ASSISTANCE DEVICE

CROSS-REFERENCE TO RELATED APPLICATION(S)

This application claims the benefit of U.S. Provisional Patent Application No. 63/641,513 filed on May 2, 2024, the complete disclosure of which, in its entirety, is herein incorporated by reference.

BACKGROUND

Technical Field

The Embodiments Herein Generally Relate to Gas Pump Handles, and More particularly to squeeze handle mechanisms for pumping gas.

Description of the Related Art

According to the Centers for Disease Control and Prevention (CDC), nearly 68.5 million people in the United States suffer from arthritis, which can cause a loss of fine motor skills including a loss of strength, making everyday tasks such as pumping gas extremely difficult, painful, and nearly impossible to accomplish. The squeeze mechanism in typical gas pump handles requires a user to squeeze a lever in the handle upwards at a sufficient force to allow gas to flow through the handle's nozzle without disruption. Additionally, gas pump handles vary from handle-to-handle where some require greater force than others to accomplish the gas flow triggering effect. Moreover, while gas pump handles typically have a catch to allow the lever to remain in the engaged position while gas is being pumped, some handles have broken catches or catches that slip requiring the user to either continuously squeeze the lever against the handle for the entire duration of while gas is being pumped or to keep attempting to engage the lever against the catch. Again, for users suffering from arthritis, these actions are extremely painful and nearly impossible to accomplish. Accordingly, there is a need for a device to assist those with limited motor function to pump gas independently, promoting autonomy and independence.

SUMMARY

In view of the foregoing, an embodiment herein provides a fully automatic gas pumping assistance device that requires reduced force and effort to actuate by the user. The device is triggered by pushing a button. The device comprises a housing containing electronic components, including batteries, a servo motor, a custom printed circuit board (PCB), a charging port, an on-off switch, and a gear system. A first button on top of the housing serves as a triggering lever, expanding the area that can be pressed to actuate a smaller second button inside, minimizing the fine motor skill required to cause the triggering function. When the lever is pressed, the servo motor turns a cam 90 degrees via the gear system, beginning the gas pumping process. Pressing the first button again returns the cam to its resting position, thereby stopping the flow of gas.

A fuel pump assistance device comprising a housing containing electronic components and a gear system; a housing cover attached to the housing; a first button attached to the housing cover; a second button positioned inside the housing cover and actuated by the first button; a cam operatively connected to the gear system; a servo motor controlled by a printed circuit board (PCB) and configured to rotate the cam via the gear system between a resting position and an engaged position in response to actuation of the second button; and a back cover operatively connected to the housing and configured to restrict rotation of the device about an axle connected to the cam.

The first button may comprise a flexible material with an outer surface containing an engagement position and an inner surface comprising the second button, and the inner surface may be substantially aligned with the engagement position of the outer surface. The housing may comprise a base portion operatively connected to a body portion, wherein the base portion may comprise a notch configured to accommodate a charging port, and wherein the body portion may comprise a plurality of holders to secure the electronic components within the housing. The housing cover may comprise a pair of sidewalls spaced apart by a back wall, an angled wall, a front wall, and a top wall, wherein the angled wall may comprise a hole configured to engage the second button, and wherein each of the pair of sidewalls may comprise at least one elongated slotted tab extending outwardly for attachment to the housing.

The back cover may comprise an elongated portion with a spacer positioned on a portion of a second surface of the elongated portion and a lip attached to the spacer, and wherein the back cover may be configured to attach to the housing to provide access to the electronic components while creating a bar that restricts rotation of the device about the axle. The cam may be configured to rotate 90 degrees from the resting position to the engaged position when the first button is pressed, and wherein the cam may comprise a body having a curved upper portion and an oppositely positioned flat lower portion, with a channel configured to accommodate the axle. The gear system may comprise a first gear operatively connected to the servo motor and a second gear operatively connected to the first gear, wherein the second gear is connected to the cam via the axle. The PCB may comprise a microcontroller configured to command the servo motor to switch between preset positions based on a state of the second button. The housing cover may comprise an elongated member configured to align with an elongated tab of the first button.

Another embodiment provides a system for assisting with pumping fuel, the system comprising: a fuel pump assistance device configured to be removably attached to a gas pump handle having a squeeze lever and a handle frame, the fuel pump assistance device comprising: a housing containing electronic components; a housing cover attached to the housing; a button mechanism comprising a first button on an exterior of the housing cover and a second button positioned inside the housing cover and actuated by the first button; a rotatable cam driven by a servo motor via a gear system, the cam configured to apply force to the squeeze lever of the gas pump handle when rotated to an engaged position; and a microcontroller configured to control rotation of the cam between a resting position and the engaged position in response to actuation of the button mechanism.

The rotatable cam may be configured to exert a moment on the squeeze lever resulting in a frictional force that keeps the fuel pump assistance device attached to the gas pump handle regardless of orientation, thereby allowing a user to let go of the fuel pump assistance device while fuel is being pumped. The housing may comprise a front wall having an aperture substantially centrally positioned in the front wall, the aperture configured to accommodate a ball bearing to allow an axle to rotate the cam, and wherein the housing may further comprise a cross wall containing a pair of connector holes that align with corresponding connector holes of the housing cover to allow connection of the housing to the housing cover.

The first button may comprise an outer surface containing an engagement position with raised members, an inner surface with the second button positioned to substantially align with the engagement position, and wherein the inner surface is substantially partitioned into a plurality of portions comprising a thin portion, a thick portion, and an intermediate portion with the second button positioned in the intermediate portion. The cam may be configured to be positioned between the squeeze lever and a gas handle catch of the gas pump handle, and wherein the cam may comprise a knob-like body having a curved upper portion and an oppositely positioned flat lower portion with a channel configured from the flat lower portion upwards through the body. The microcontroller may be configured to command the servo motor to switch between preset positions in response to a push-push activation of the button mechanism, wherein the electronic components may further comprise a battery, the servo motor, a PCB, a charging port covered by a removable charging cap, and an on-off switch, and wherein the housing comprises a charging cap removably attached to the housing to cover the charging port.

Another embodiment provides an automated method for pumping fuel, the method comprising: positioning a fuel pump assistance device on a gas pump handle such that a cam of the fuel pump assistance device is located between a squeeze lever and a handle frame of the gas pump handle; actuating a first button of the fuel pump assistance device to toggle a second button positioned inside the fuel pump assistance device; rotating the cam from a resting position to an engaged position via a servo motor and gear system in response to the actuation of the second button, wherein the rotation of the cam applies a force to the squeeze lever to enable fuel flow; and maintaining the cam in the engaged position until the first button is actuated again to return the cam to the resting position.

The first button may comprise a flexible material configured to bend when pressed, and wherein actuating the first button may comprise applying pressure to an engagement position on an outer surface of the first button such that the flexible material bends and causes an inner surface of the first button to actuate the second button without requiring continuous pressing from the user. The method may comprise toggling the second button to remain in position when actuated by the first button, wherein the toggling switches the second button between two preset positions to control actuation of the servo motor and rotation of the cam.

The method may comprise securing the fuel pump assistance device in position via interaction between a back cover and a housing of the fuel pump assistance device, wherein the back cover may comprise an elongated portion with a spacer and a lip that creates a structural support to prevent the fuel pump assistance device from rotating about an axle when the cam exerts force on the squeeze lever of the gas pump handle. Rotating the cam may comprise rotating the cam 90 degrees from the resting position to the engaged position, and wherein rotating the cam may comprise transmitting power from the servo motor through a first gear to a second gear connected to the cam via an axle. The rotation of the cam may create a frictional force between the cam and the squeeze lever that retains the fuel pump assistance device on the gas pump handle without requiring the user to hold the fuel pump assistance device, thereby allowing the user to disengage from the fuel pump assistance device while fuel is being pumped.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Figure 1A:
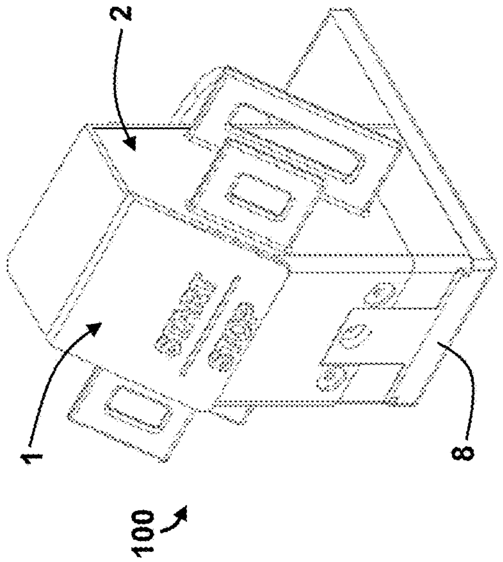
FIGS. 1A through 1M are schematic diagrams illustrating a fuel pump assistance device, according to a first embodiment herein.
Figure 1D:
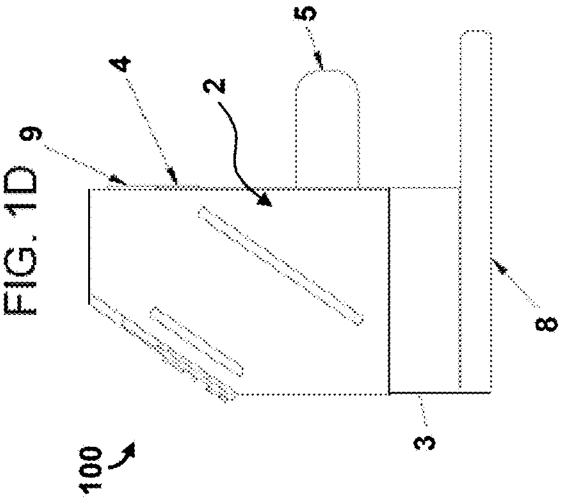
Figure 1B:
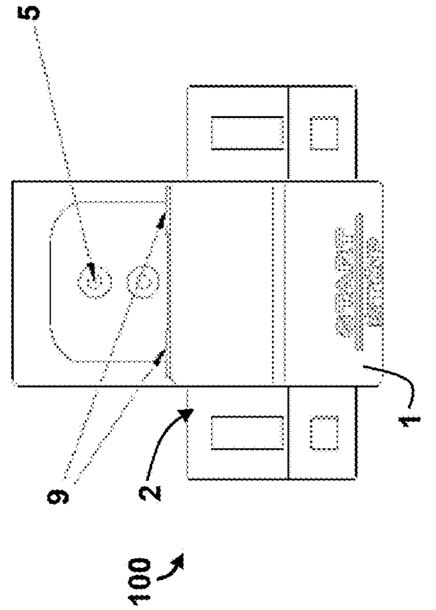
Figure 1C:
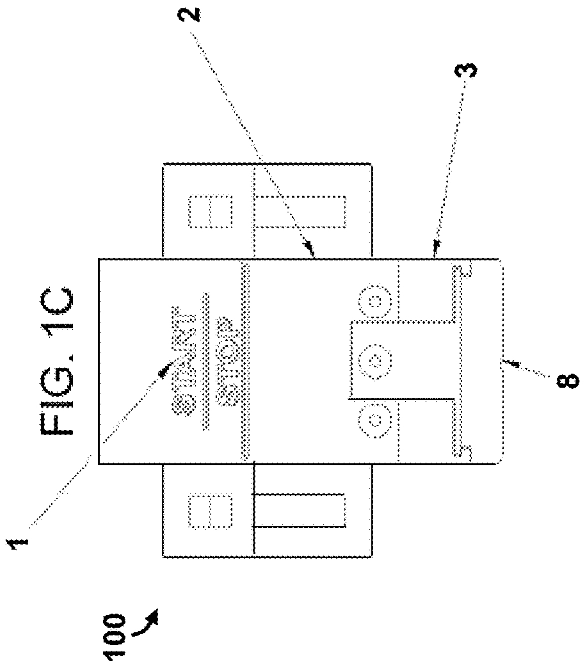
Figure 1F:
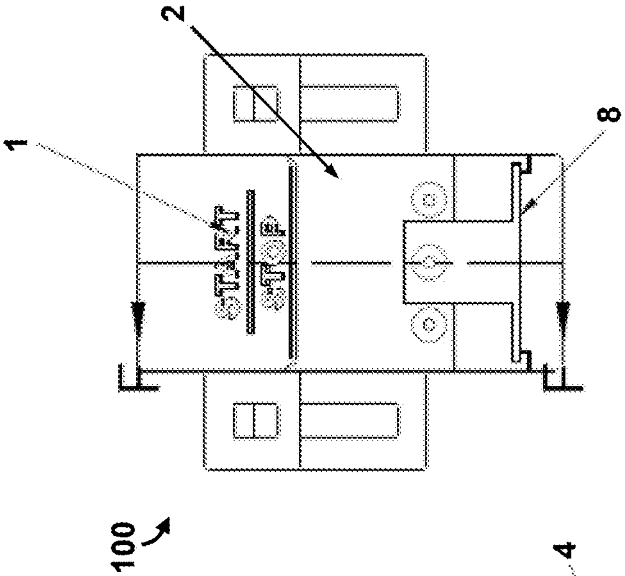
Figure 1G:
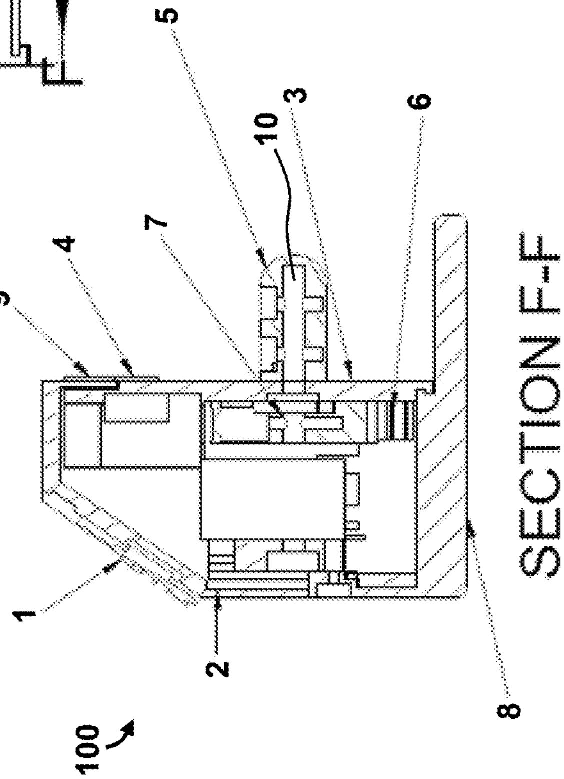
Figure 1E:
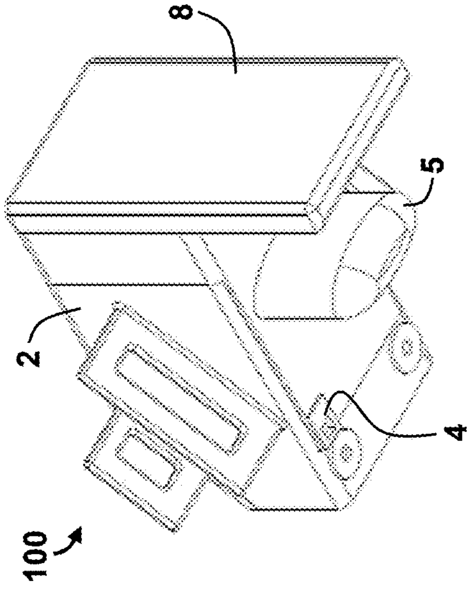
Figure 1H:
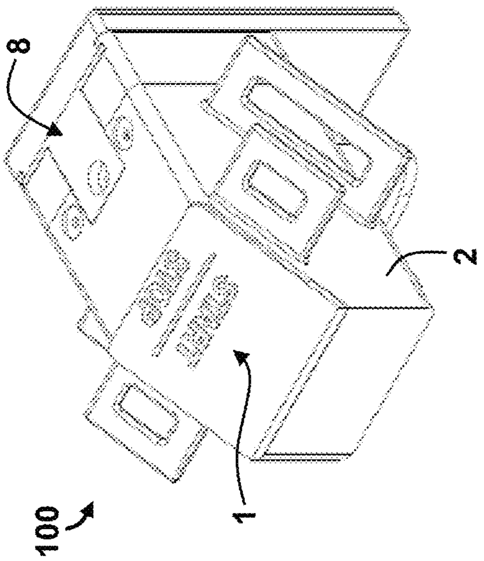
Figure 1I:
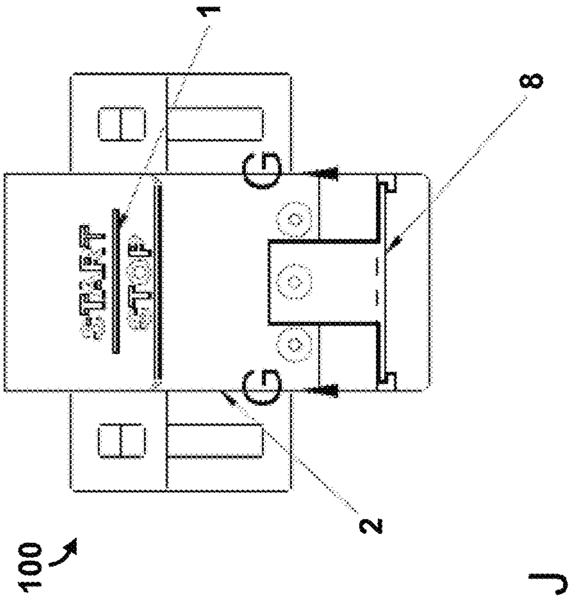
Figure 1J:
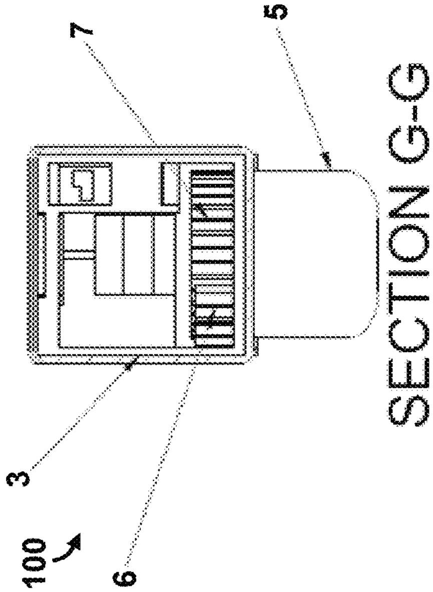
Figure 1M:
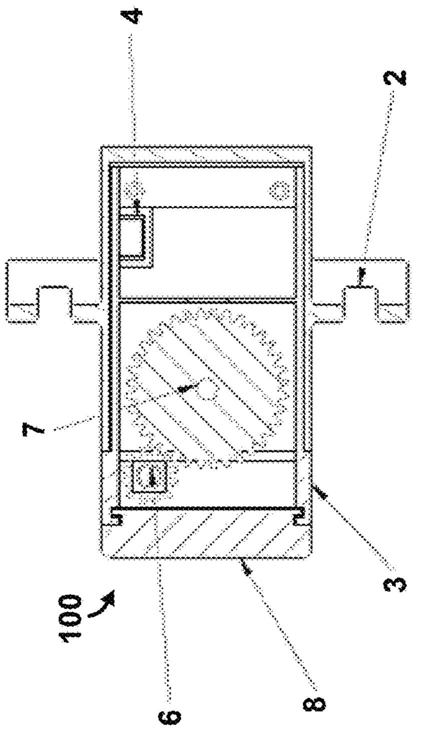
Figure 1L:
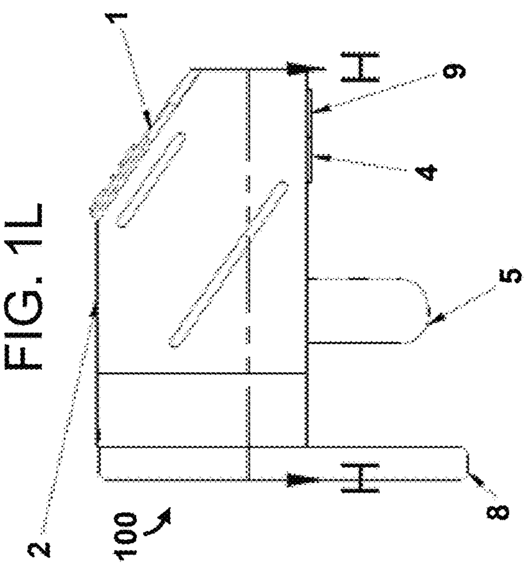
Figure 1K:
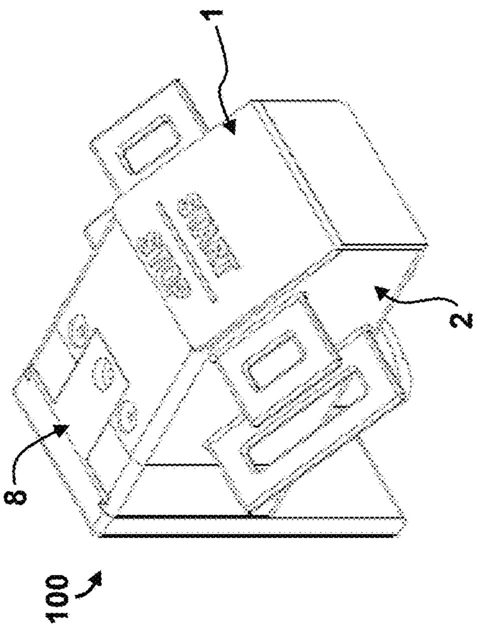
Figures 1N, 1O, 1P, 1Q:
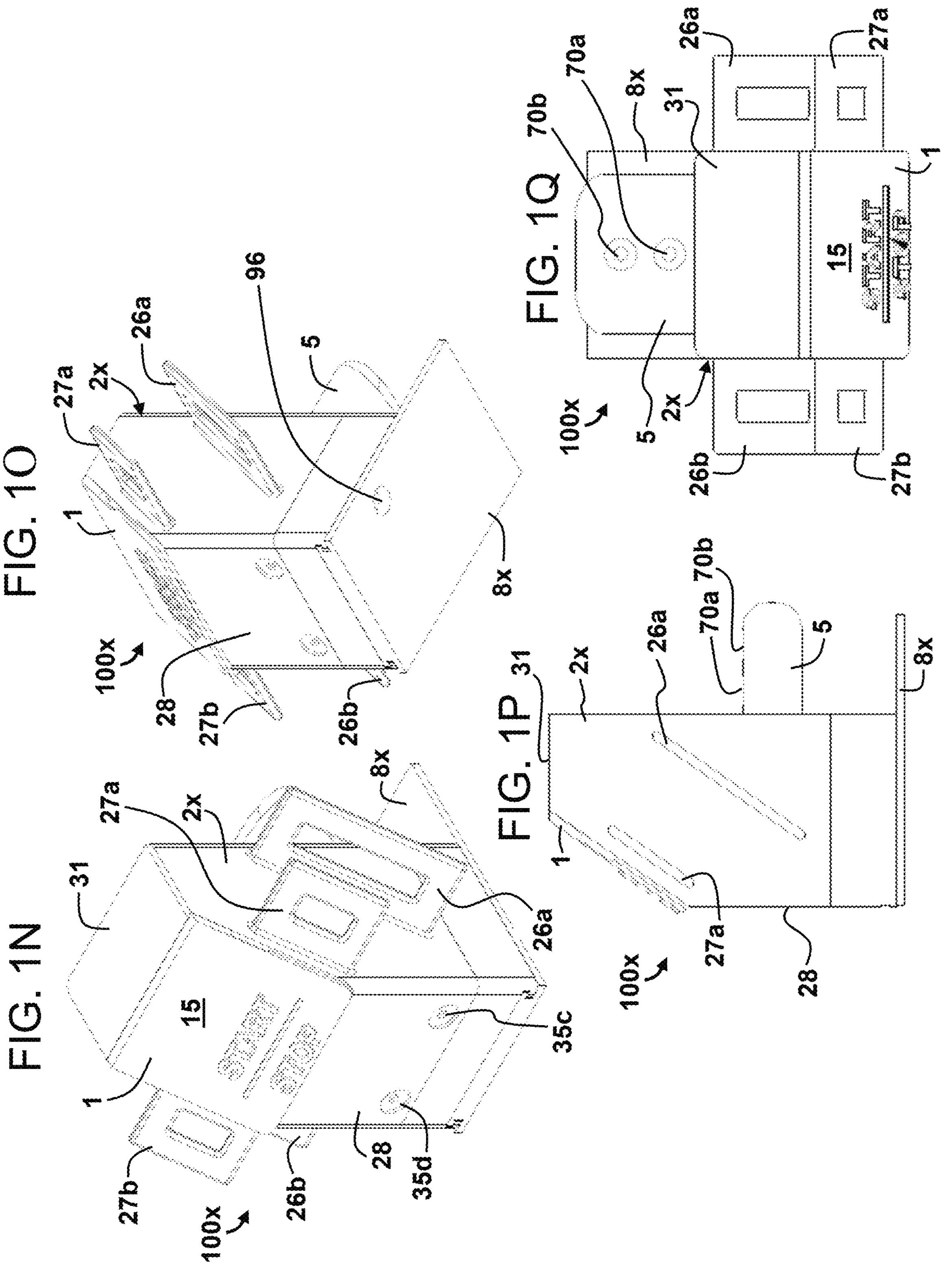
FIGS. 1N through 1V are schematic diagrams illustrating a fuel pump assistance device, according to a second embodiment herein.
Figure 1T:
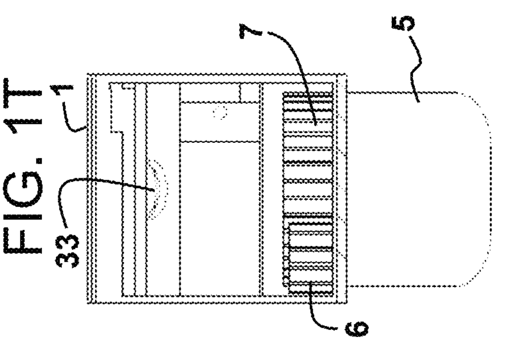
Figure 1S:
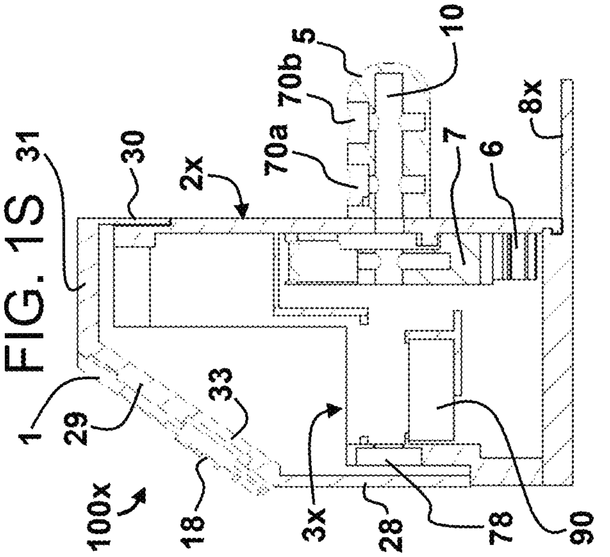
Figure 1R:
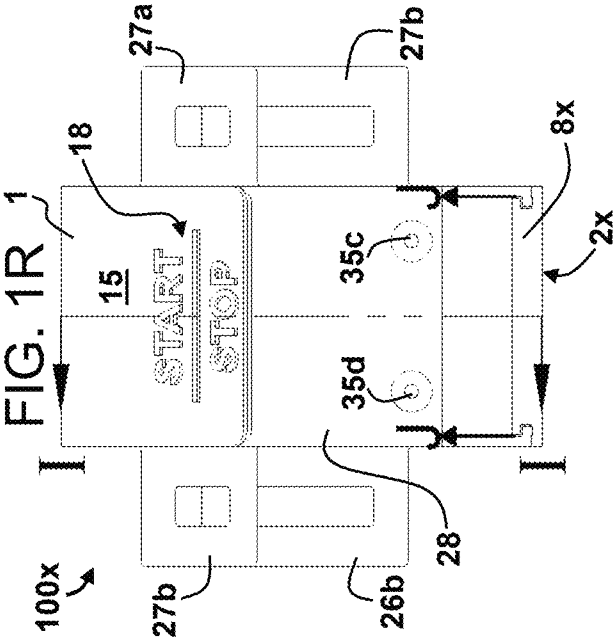

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

Although the terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Moreover, when an element is referred to as being "connected", "operatively connected", or "coupled" to another element, it can be directly connected or coupled to the other element or intervening elements may be present. Conversely, when an element is referred to as being "directly connected" or "directly coupled" to another element, there are no intervening elements present.

Furthermore, although the terms "upper", "lower", "bottom", "side", "intermediate", "middle", and "top", etc. may be used herein to describe various elements, but these elements should not be limited by these terms. These terms are only used to distinguish one element from another. For example, a first element could be termed an "upper" element and, similarly, a second element could be termed an "upper" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprise(s)", "comprising", "include(s)", and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

As used in the context herein, "fuel pump assistance device" refers to an electromechanical device configured to automate the squeezing of a gas pump handle to enable fuel flow with minimal manual effort from a user.

As used in the context herein, "housing" refers to a structural component containing electronic components and a gear system.

As used in the context herein, "electronic components" refers to electrical and electronic parts including batteries, servo motor, printed circuit board (PCB), charging port, on-off switch, and other related components.

As used in the context herein, "gear system" refers to a mechanical assembly comprising a first gear operatively connected to a servo motor and a second gear connected to a cam via an axle.

As used in the context herein, "housing cover" refers to a protective enclosure attached to the housing providing a handle mechanism and supporting a first button.

As used in the context herein, "first button" refers to a flexible lever with an outer surface containing an engagement position and an inner surface comprising a second button.

As used in the context herein, "second button" refers to a smaller button positioned inside the housing cover and actuated by the first button.

As used in the context herein, "cam" refers to a rotatable mechanical component operatively connected to the gear system.

As used in the context herein, "servo motor" refers to an electric motor controlled by a PCB and configured to rotate the cam via the gear system.

As used in the context herein, "printed circuit board (PCB)" refers to an electronic board containing an electrical circuit that controls the servo motor based on user input.

As used in the context herein, "resting position" refers to the initial orientation of the cam at 0 degrees before activation.

As used in the context herein, "engaged position" refers to the activated orientation of the cam at 90 degrees that applies force to the squeeze lever.

As used in the context herein, "back cover" refers to a structural support component operatively connected to the housing and configured to restrict rotation of the device about an axle.

As used in the context herein, "axle" refers to a rod or shaft that connects the second gear to the cam and allows for rotation.

As used in the context herein, "gas pump handle" refers to the handle portion of a fuel dispensing unit at a gas station.

As used in the context herein, "squeeze lever" refers to the trigger mechanism on a gas pump handle that controls the flow of fuel.

As used in the context herein, "handle frame" refers to the outer body structure of the gas pump handle.

As used in the context herein, "button mechanism" refers to the combined assembly of the first button and second button system that triggers the device operation.

As used in the context herein, "microcontroller" refers to a small computer on the PCB that processes input from the second button and controls the servo motor.

As used in the context herein, "charging port" refers to a connection point for attaching a power cable to recharge the battery.

As used in the context herein, "charging cap" refers to a removable cover configured to protect the charging port.

As used in the context herein, "force" refers to the physical pressure applied by the cam to the squeeze lever to enable fuel flow.

As used in the context herein, "moment" refers to the rotational force exerted by the cam on the squeeze lever.

As used in the context herein, "frictional force" refers to the resistance force created between the cam and squeeze lever that helps secure the device in place.

As used in the context herein, "base portion" refers to the lower section of the housing.

As used in the context herein, "body portion" refers to the main section of the housing that contains the electronic components.

As used in the context herein, "engagement position" refers to the area on the first button that a user presses to activate the device.

As used in the context herein, "flexible material" refers to the pliable substance that allows the first button to bend when pressed.

As used in the context herein, "push-push activation" refers to the toggle mechanism where pressing the button once activates the device and pressing it again deactivates it.

As used in the context herein, "gas handle catch" refers to the locking mechanism on a gas pump handle that normally holds the squeeze lever in place.

The embodiments herein provide a fuel pump assistance device to allow for an automated replacement for a user manually squeezing a gas pump handle. Referring now to the drawings, and more particularly to FIGS. 1A through 16D, where similar reference characters denote corresponding features consistently throughout, there are shown exemplary embodiments. In the drawings, the size and relative sizes of components, layers, and regions, etc. may be exaggerated for clarity.

FIGS. 1A through 1M are schematic diagrams illustrating a fuel pump assistance device 100, according to a first embodiment herein. The device 100 comprises a first button 1 attached to a housing cover 2. The housing cover 2 is configured to substantially enclose a housing 3. A charging cap 4 is removably attached to the housing 3. The charging cap 4 is configured to cover a charging port to accommodate a corresponding wire (not shown) for supplying power for the battery (not shown in FIGS. 1A through 1M). The housing cover 2 is attached to the housing 3 using any suitable retaining member (not shown) such as a screw, etc. and a washer 9 may be included to provide for the suitable engagement of the retaining member to connect the housing cover 2 to housing 3. The housing cover 2 is attached to a back cover 8. The housing 3 is configured to house a first gear 6 and a second gear 7 such that the first gear 6 and the second gear 7 are rotationally connected to each other. A cam 5 is operatively connected to the second gear 7 via an axle 10.

FIGS. 1N through 1V, with reference to FIGS. 1A through 1M, are schematic diagrams illustrating a fuel pump assistance device 100*x*, according to a second embodiment herein. The device 100*x* comprises a first button 1 attached to a housing cover 2*x*. The housing cover 2*x* is configured to substantially enclose a housing 3*x*. Although not shown in FIGS. 1N through 1V, a charging cap 4*x* is removably attached to the housing 3*x*. The charging cap 4*x* is configured to cover a charging port to accommodate a corresponding wire (not shown) for supplying power for the battery (not shown in FIGS. 1N through 1V). The housing cover 2*x* is attached to the housing 3*x* using any suitable retaining member (not shown) such as a screw, etc. and a washer 9 (not shown in FIGS. 1N through 1V) may be included to provide for the suitable engagement of the retaining member to connect the housing cover 2*x* to housing 3*x*. The housing 3*x* is connected to a back cover 8*x* using a retaining member (not shown) that is inserted through the hole 96 in the back cover 8*x* and engages a corresponding retention hole 97 (shown in FIG. 4G) of the housing 3*x* thereby retaining the housing 3*x* and the back cover 8*x* together. The housing 3*x* is configured to house a first gear 6 and a second gear 7 such that the first gear 6 and the second gear 7 are rotationally connected to each other. A cam 5 is operatively connected to the second gear 7 via an axle 10.

Figure 1V:
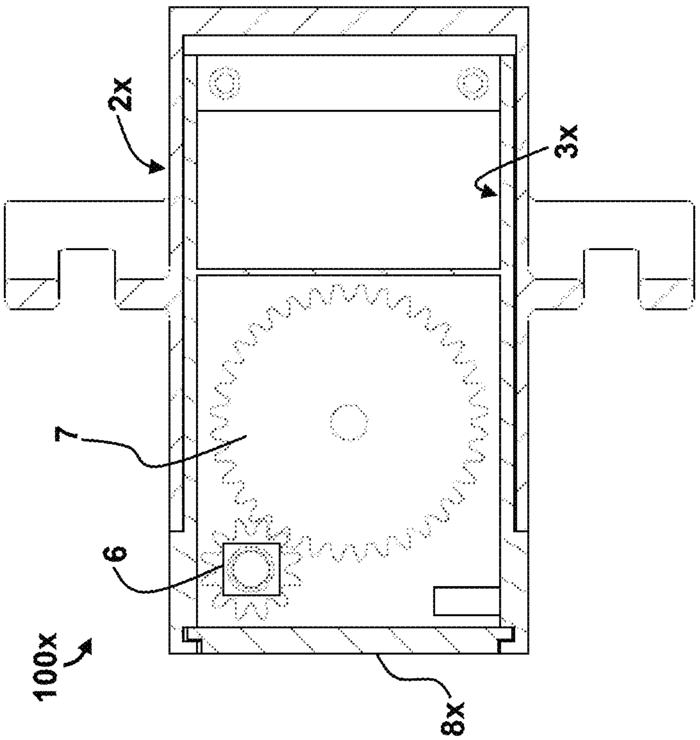
Figure 1U:
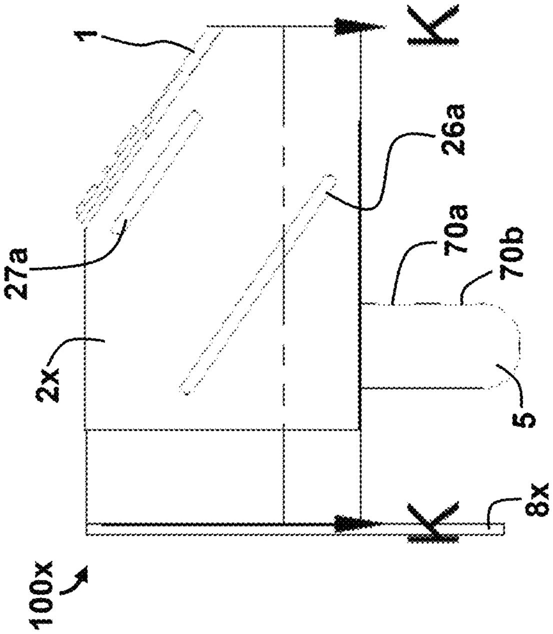
Figure 2A:
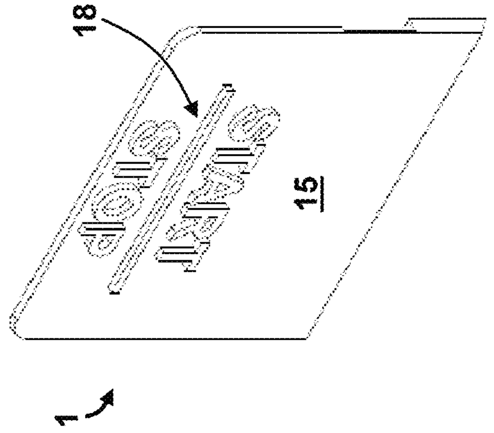
FIGS. 2A through 2D are schematic diagrams illustrating a first button of the fuel pump assistance device of FIGS. 1A through 1V, according to the embodiments herein.
Figure 2D:
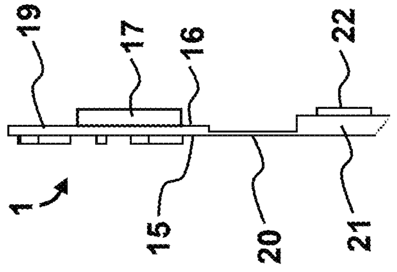
Figure 2B:
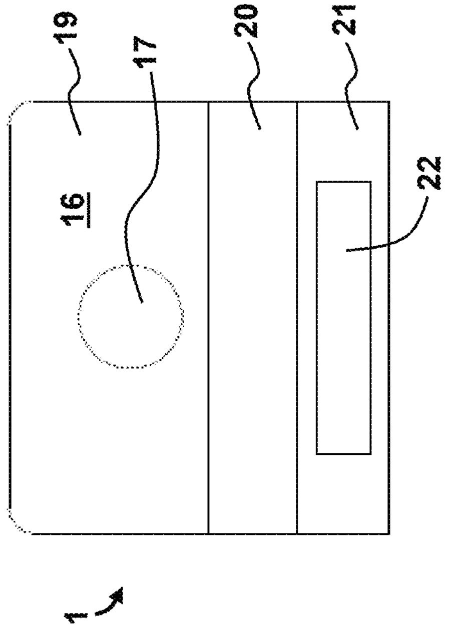
Figure 2C:
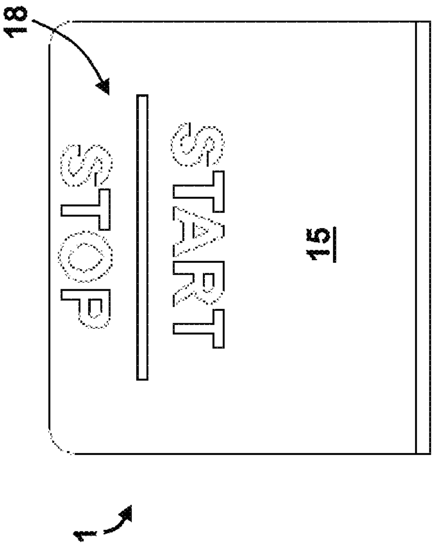
Figures 3A, 3B, 3C, 3D, 3E:
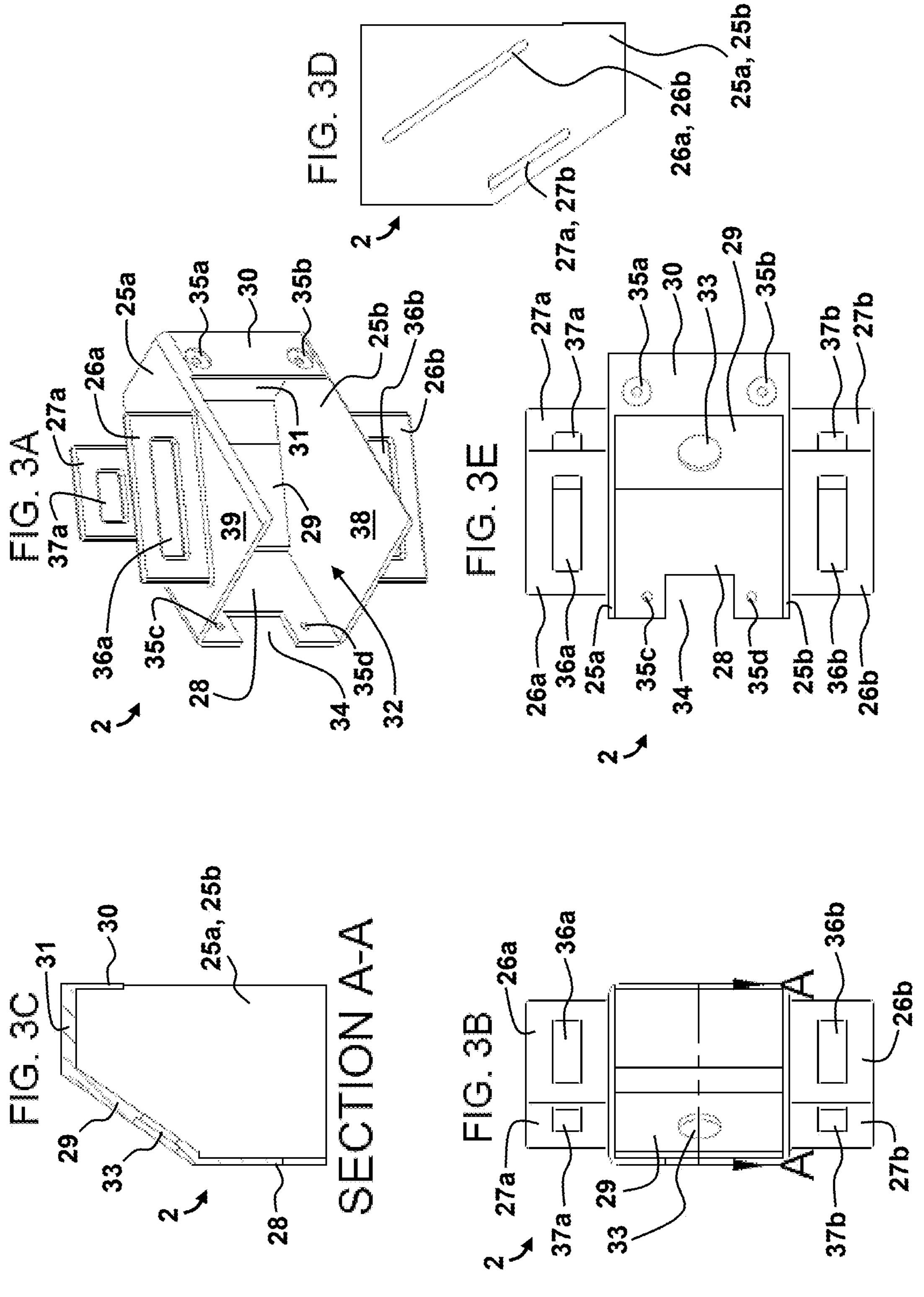
FIGS. 3A through 3E are schematic diagrams illustrating a housing cover of the fuel pump assistance device of FIGS. 1A through 1M, according to a first embodiment herein.
Figure 3G:
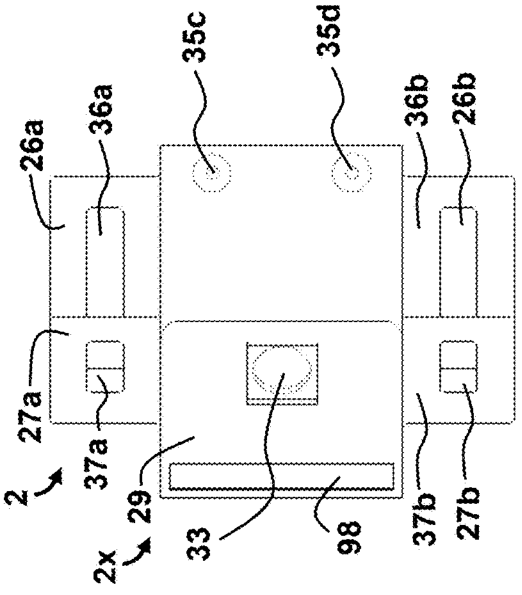
FIGS. 3F through 3I are schematic diagrams illustrating a housing cover of the fuel pump assistance device of FIGS. 1N through 1V, according to a second embodiment herein.
Figure 3I:
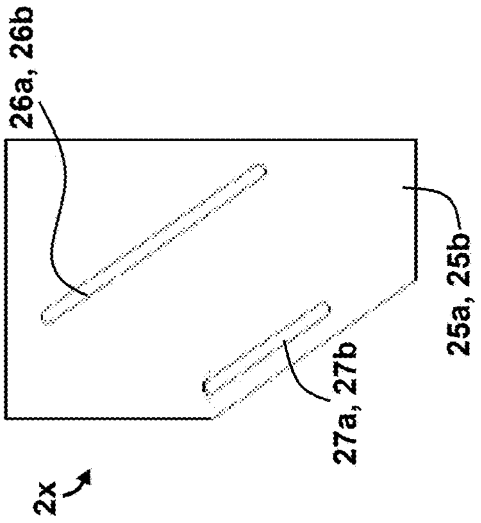
Figure 3F:
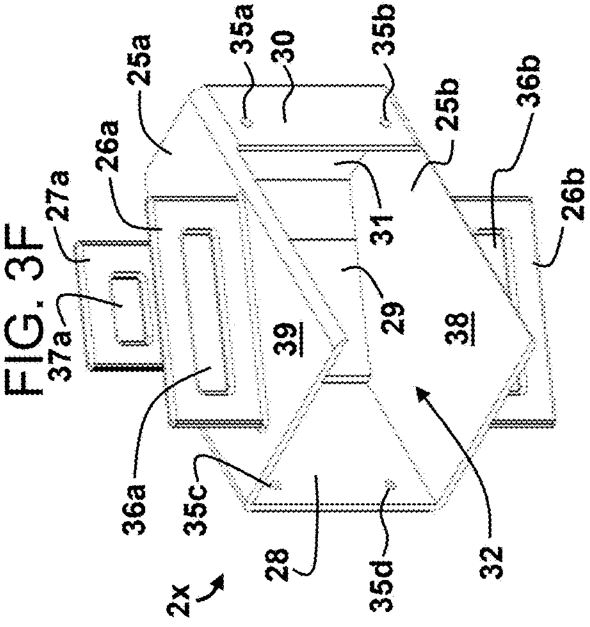
Figure 3H:
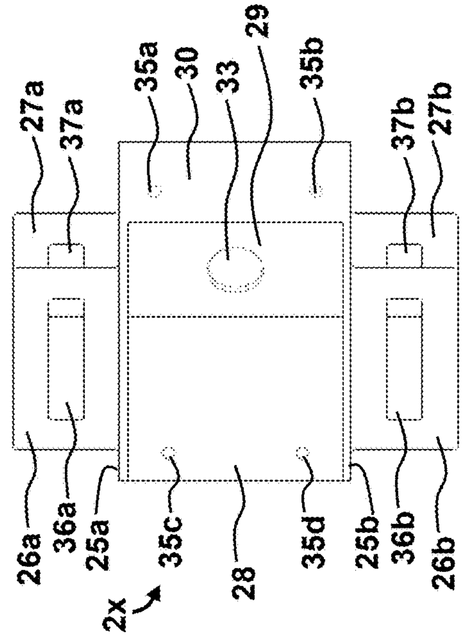
Figure 4C:
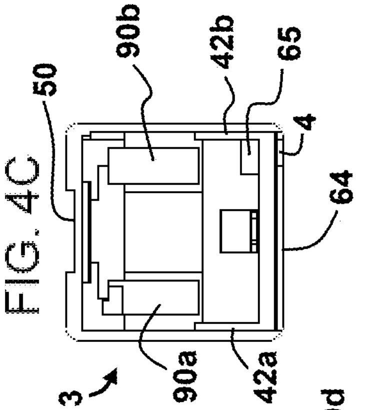
FIGS. 4A through 4F are schematic diagrams illustrating a housing of the fuel pump assistance device of FIGS. 1A through 1M, according to a first embodiment herein.
Figure 4F:
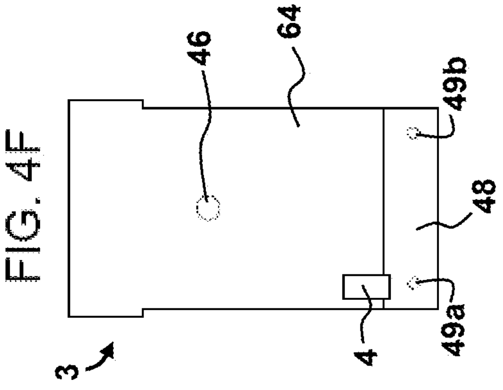
Figure 4B:
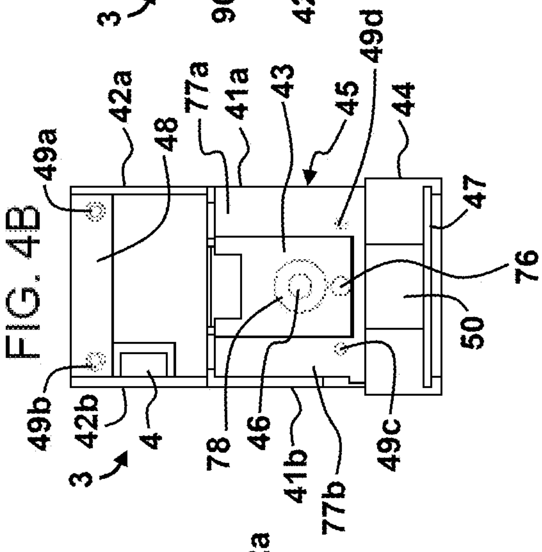
Figure 4E:
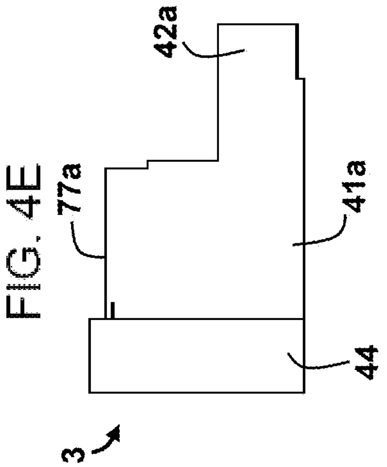
Figure 4A:
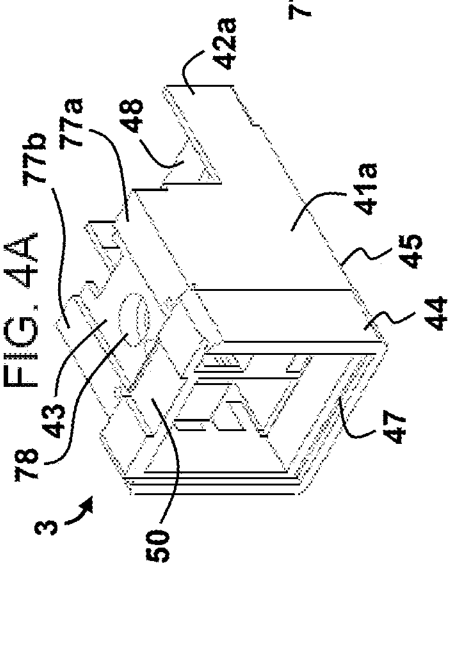
Figure 4D:
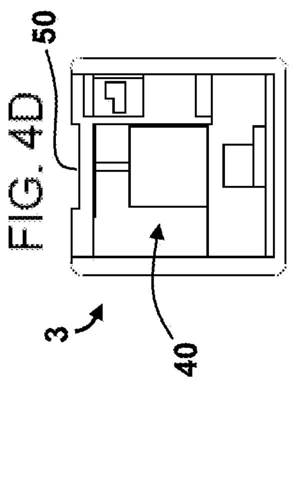
Figures 4G, 4H, 4I, 4J, 4K, 4L:
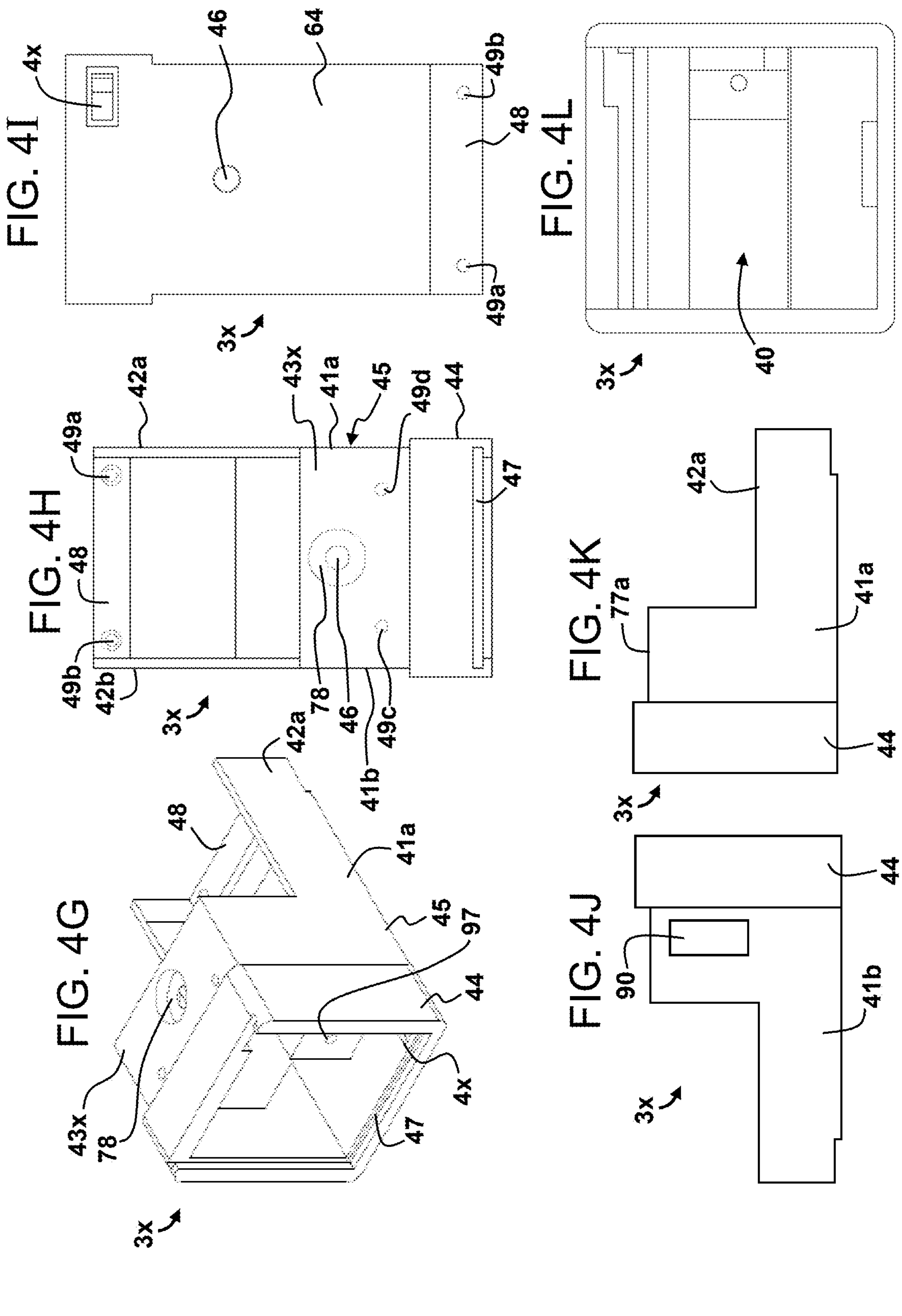
FIGS. 4G through 4L are schematic diagrams illustrating a housing of the fuel pump assistance device of FIGS. 1N through 1V, according to a second embodiment herein.
Figure 5B:
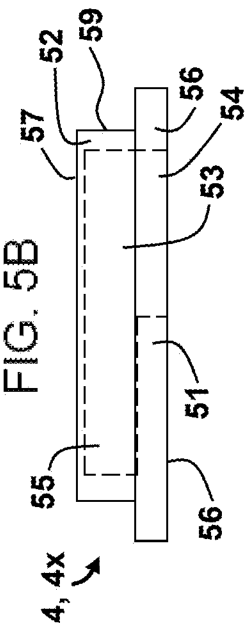
FIGS. 5A through 5D are schematic diagrams illustrating a charger cap of the fuel pump assistance device of FIGS. 1A through 1M, according to the embodiments herein.
Figure 5D:
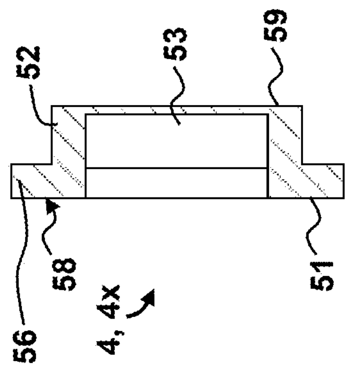
Figure 5A:
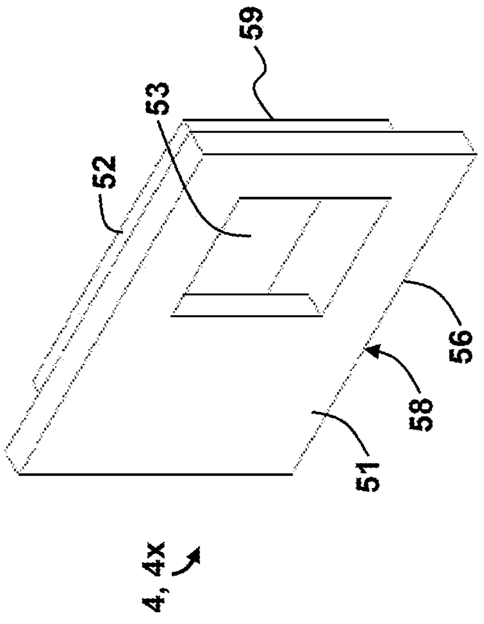
Figure 5C:
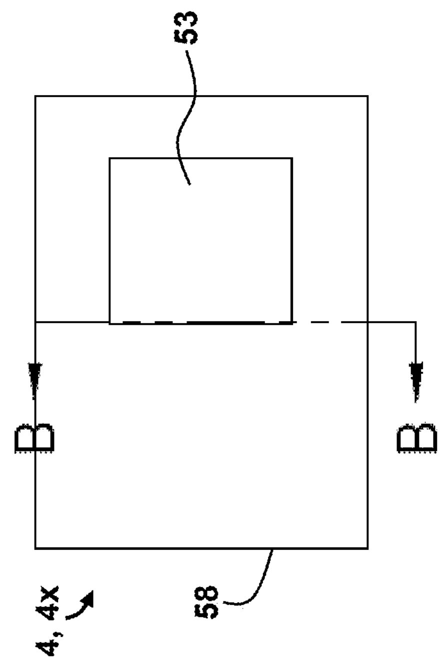
Figure 6A:
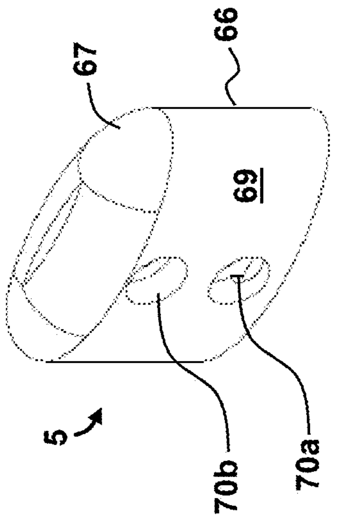
FIGS. 6A through 6D are schematic diagrams illustrating a cam of the fuel pump assistance device of FIGS. 1A through 1V, according to the embodiments herein.
Figure 6B:
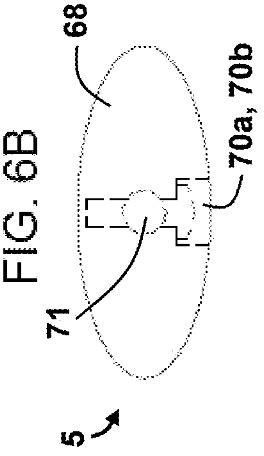
Figure 6C:
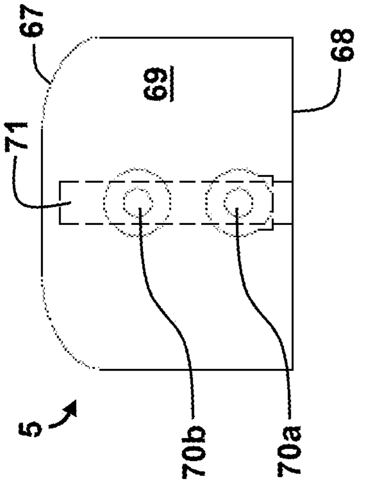
Figure 6D:
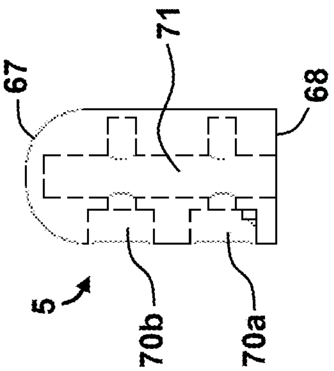
Figure 7D:
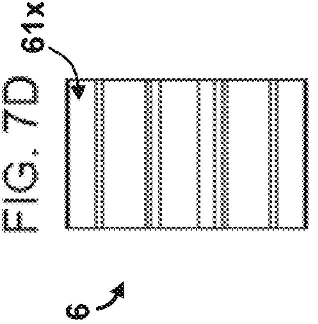
FIGS. 7A through 7D are schematic diagrams illustrating a first gear of the fuel pump assistance device of FIGS. 1A through 1V, according to the embodiments herein.
Figure 7A:
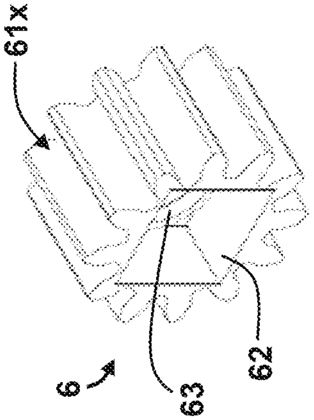
Figure 7B:
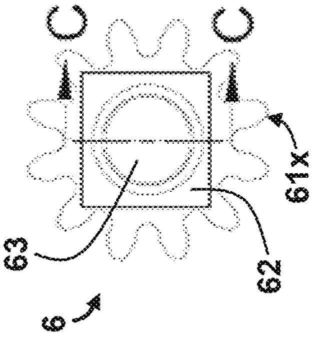
Figure 7C:
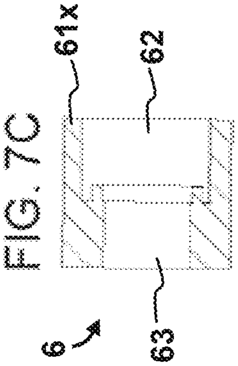
Figure 8A:
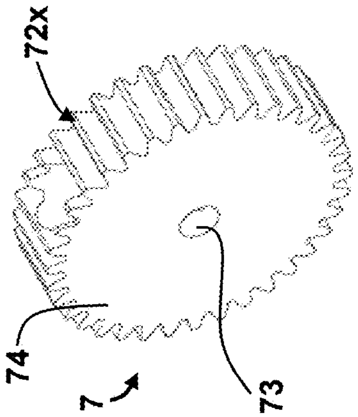
FIGS. 8A through 8D are schematic diagrams illustrating a second gear of the fuel pump assistance device of FIGS. 1A through 1V, according to the embodiments herein.
Figure 8D:
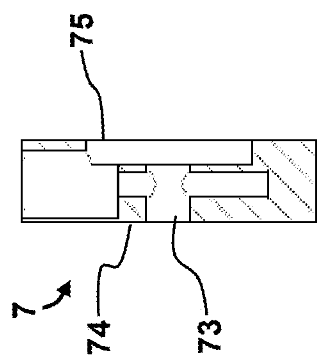
Figure 8C:
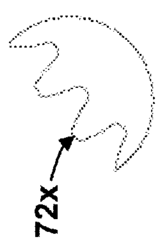
Figure 8B:
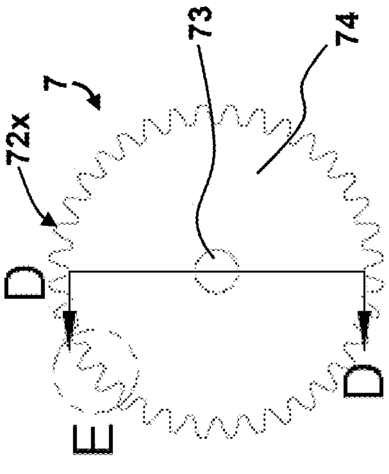
Figure 9A:
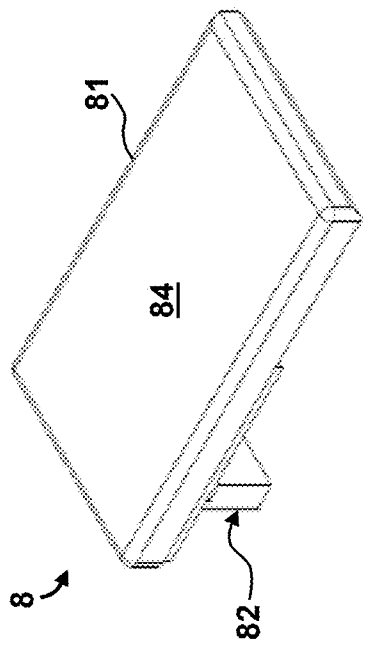
FIGS. 9A through 9D are schematic diagrams illustrating a back cover of the fuel pump assistance device of FIGS. 1A through 1M, according to a first embodiment herein.
Figure 9B:
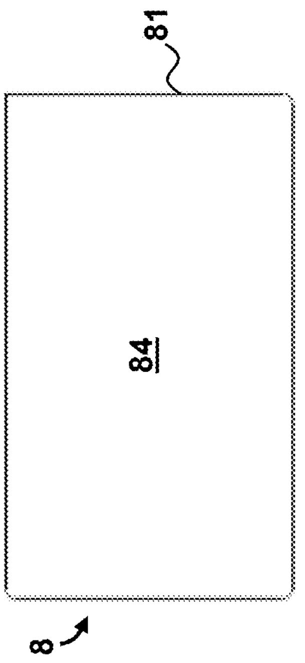
Figure 9C:
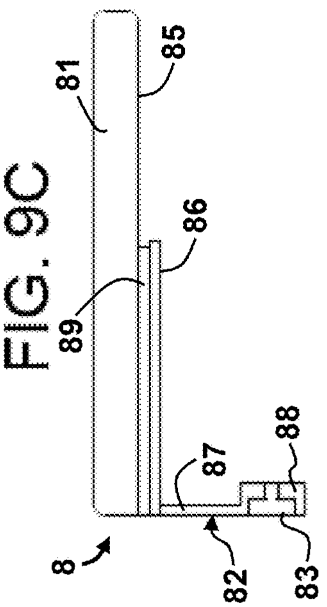
Figure 9D:
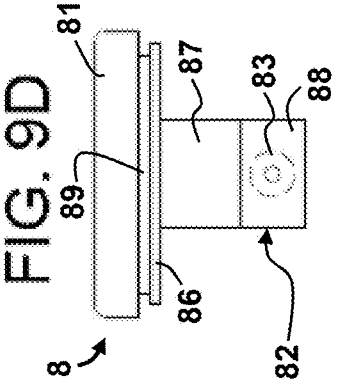
Figure 9F:
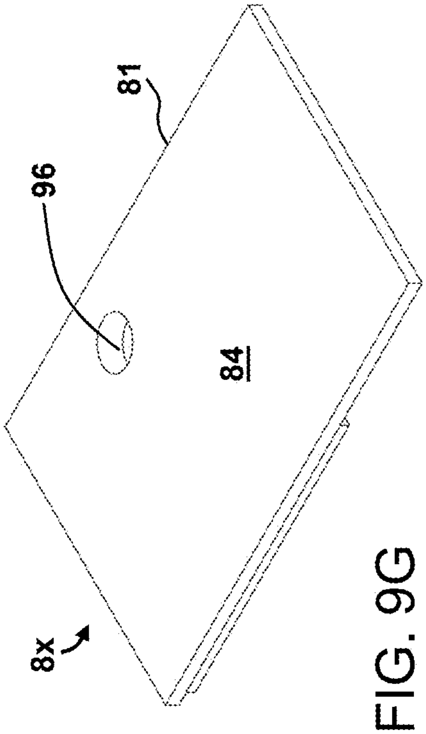
FIGS. 9E through 9I are schematic diagrams illustrating a back cover of the fuel pump assistance device of FIGS. 1N through 1V, according to a second embodiment herein.
Figure 9G:
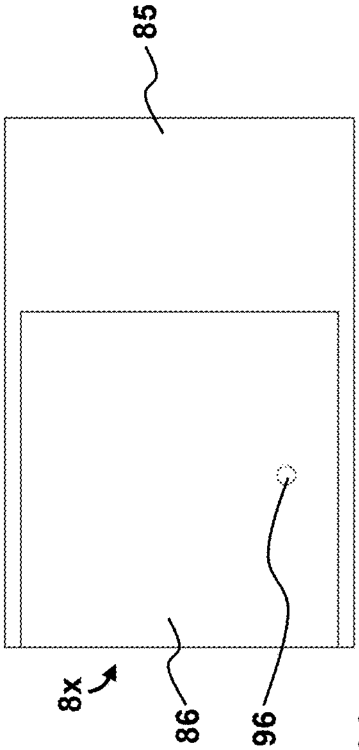
Figure 9I:
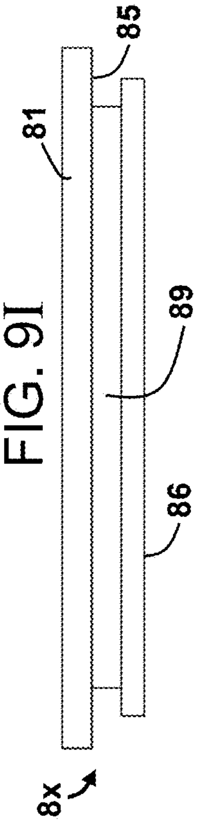
Figure 9E:
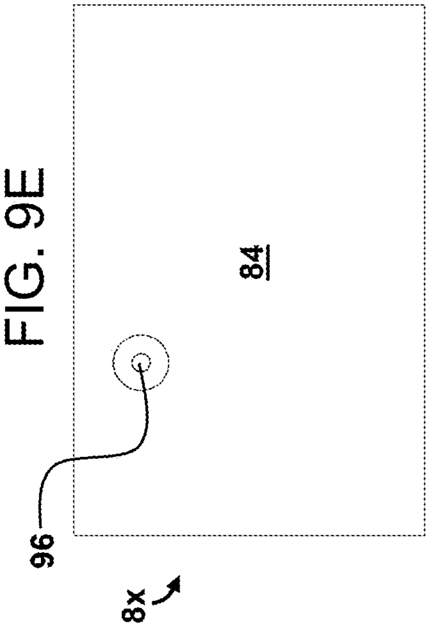
Figure 9H:
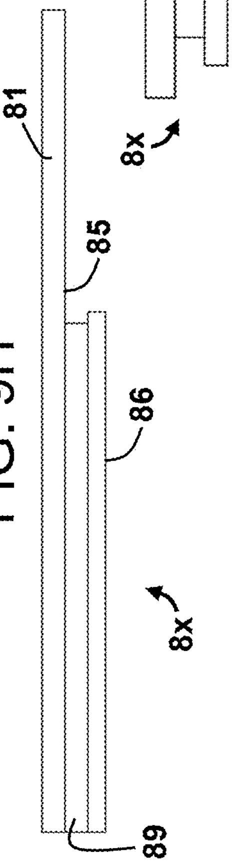

FIGS. 2A through 2D, with reference to FIGS. 1A through 1V, are schematic diagrams illustrating the first button 1 of the fuel pump assistance device 100, 100*x* of FIGS. 1A through 1V, according to the embodiments herein. The first button 1 comprises an outer surface 15 and an oppositely positioned inner surface 16. The outer surface 15 contains an engagement position 18, which may comprise raised lettering to indicate "START" and "STOP" for a user to visually and/or tactilely to engage the first button 1. The inner surface 16 comprises a second button 17 that substantially aligns on the inner surface 16 to the opposite side of the engagement position 18 of the outer surface 15. Moreover, the inner surface 16 may be substantially partitioned into a plurality of positions comprising a thin portion 20, a thick portion 21, and an intermediate portion 19 such that the second button 17 may be positioned in the intermediate portion 19. The relative thicknesses of the portions 19, 20, 21 can best be seen in FIG. 2D. The first button 1 is configured as a large, flexible plastic button cover that acts as a lever, expanding the area that can be pressed by a user to actuate a the smaller second button 17 inside the housing 3, 3*x*. In this regard, the first button 1 may be made of a flexible plastic material that allows the first button 1 to bend when pressed. Moreover, the first button 1 serves as a lever that expands the area that can be hit to actuate the smaller second button 17 on the inside of the housing cover 2, 2*x*, thereby decreasing the amount of fine motor skill required to use the device 100. The thick portion 21 is thicker than the thin portion 20, which allows the thick portion 21 to be fixed to the housing cover 2, 2*x* using epoxy. More particularly, the thick portion 21 may comprise an elongated tab 22, which may be covered by an adhesive or epoxy for connecting the first button 1 to the housing cover 2.

The flexible plastic material used for the first button 1 may be configured to have an optimal flexural modulus that provides sufficient resistance to prevent accidental activation while still allowing easy pressing by users with limited hand strength. Thermoplastic elastomers (TPE) or polypropylene are particularly suitable materials for this purpose, as they provide a good combination of flexibility and tactile feedback. This material maintains its elastic properties across a wide temperature range (−20° C. to 60° C.), ensuring consistent performance in various climate conditions encountered at gas stations. In some examples, the material thickness varies across the structural profile of the first button 1, with the thin portion 20 being approximately 1.0-1.5 mm thick to allow for easy bending, while the thick portion 21 measures 3.0-4.0 mm to provide structural stability. However, the embodiments herein are not restricted to these particular materials and thicknesses.

FIGS. 3A through 3E, with reference to FIGS. 1A through 2D, are schematic diagrams illustrating the housing cover 2 of the fuel pump assistance device 100 of FIGS. 1A through 1M, according to a first embodiment herein. The housing cover 2 comprises a pair of sidewalls 25*a*, 25*b* that are spaced apart by a back wall 28, an angled wall 29, a front wall 30, and a top wall 31. The pair of sidewalls 25*a*, 25*b* each comprise an inner surface 38 and an outer surface 39. Moreover, the back wall 28 is connected to the angled wall 29, which is connected to the top wall 31, which is connected to the front wall 30. The connected walls 28, 29, 30, 31 as well as the pair of sidewalls 25*a*, 25*b* create a hollow inner portion 32 of the housing cover 2. Each of the pair of sidewalls 25*a*, 25*b* respectively comprise a first elongated slotted tab 26*a*, 26*b* and a second elongated slotted tab 27*a*, 27*b* outwardly extending from the outer surface 39. Each first elongated slotted tab 26*a*, 26*b* comprises a first slot 36*a*, 36*b*, respectively, and each second elongated slotted tab 27*a*, 27*b* comprises a second slot 37*a*, 37*b*, respectively. The back wall 28 comprises a notch 34, and the angled wall 29 comprises a hole 33. The front wall 30 comprises a pair of connector holes 35*a*, 35*b*, which may be configured to accommodate retaining members (not shown), such as screws, etc. for connecting the housing cover 2 to the housing 3. Additionally, the back wall 28 comprises a pair of connector holes 35*c*, 35*d*, which may be configured to accommodate retaining members (not shown), such as screws, etc. for connecting the housing cover 2 to the housing 3. The housing cover 2 covers the housing 3 and the internal electronic components (not shown in FIGS. 3A through 3E) and provides a handle mechanism for a user to grasp. The hole 33 is configured to engage the second button 17 that controls the cam 5.

FIGS. 3F through 3I, with reference to FIGS. 1A through 3E, are schematic diagrams illustrating the housing cover 2*x* of the fuel pump assistance device 100*x* of FIGS. 1N through 1V, according to a second embodiment herein. The housing cover 2*x* comprises a pair of sidewalls 25*a*, 25*b* that are spaced apart by a back wall 28, an angled wall 29, a front wall 30, and a top wall 31. The pair of sidewalls 25*a*, 25*b* each comprise an inner surface 38 and an outer surface 39. Moreover, the back wall 28 is connected to the angled wall 29, which is connected to the top wall 31, which is connected to the front wall 30. The connected walls 28, 29, 30, 31 as well as the pair of sidewalls 25*a*, 25*b* create a hollow inner portion 32 of the housing cover 2*x*. Each of the pair of sidewalls 25*a*, 25*b* respectively comprise a first elongated slotted tab 26*a*, 26*b* and a second elongated slotted tab 27*a*, 27*b* outwardly extending from the outer surface 39. Each first elongated slotted tab 26*a*, 26*b* comprises a first slot 36*a*, 36*b*, respectively, and each second elongated slotted tab 27*a*, 27*b* comprises a second slot 37*a*, 37*b*, respectively. The angled wall 29 comprises a hole 33. The front wall 30 comprises a pair of connector holes 35*a*, 35*b*, which may be configured to accommodate retaining members (not shown), such as screws, etc. for connecting the housing cover 2*x* to the housing 3*x*. Additionally, the back wall 28 comprises a pair of connector holes 35*c*, 35*d*, which may be configured to accommodate retaining members (not shown), such as screws, etc. for connecting the housing cover 2*x* to the housing 3*x*. The housing cover 2*x* covers the housing 3*x* and the internal electronic components (not shown in FIGS. 3F through 3I) and provides a handle mechanism for a user to grasp. The hole 33 is configured to engage the second button 17 that controls the cam 5. The thick portion 21 of the first button 1 (of FIGS. 2A through 2D) may comprise an elongated tab 22, which may be covered by an adhesive or epoxy for connecting the first button 1 to the housing cover 2*x* and may be further configured to align with a corresponding elongated member 98 of housing cover 2*x* (shown in FIG. 3G), which may also comprise a suitable adhesive or epoxy to promote adhesion to the first button 1.

FIGS. 4A through 4F, with reference to FIGS. 1A through 3I, are schematic diagrams illustrating the housing 3 of the fuel pump assistance device 100 of FIGS. 1A through 1M, according to a first embodiment herein. The housing 3 comprises a base portion 44 connected to a body portion 45. The base portion 44 may be wider and longer than the body portion 45. The housing 3 is configured to fit in the housing cover 2 such that the housing 3 comprises a cross wall 48 containing a pair of connector holes 49*a*, 49*b* that align with the pair of connector holes 35*a*, 35*b* of the housing cover 2 to allow the housing 3 to be connected to the housing cover 2 using retaining members (not shown), such as screws, etc. The housing 3 further comprises a first sidewall 41*a* spaced apart from a second sidewall 41*b* by the cross wall 48. The first sidewall 41*a* and the second sidewall 41*b* each respectively comprise a first extension slot 42*a* and a second extension slot 42*b* such that the cross wall 48 extends between the first extension slot 42*a* and the second extension slot 42*b*. The housing 3 also includes a front wall 43 that is parallel to the cross wall 48 such that the front wall 43 is spaced apart from the cross wall 48 by the first sidewall 41*a* and the second sidewall 41*b*. The front wall 43 comprises an aperture 78 that is substantially centrally positioned in the front wall 43. Aperture 78 is configured to accommodate a ball bearing 430 (of FIG. 15) to allow the axle 10 to rotate the cam 5. Disposed within aperture 78 is a hole 46 to accommodate the axle 10. Hole 46 is configured to extend through the housing 3 and all the way to the backside 64 of the housing 3. When inserted, the axle 10 also extends through the housing 3 in hole 46 all the way to the backside 64 of the housing 3 to engage the cam 5 to permit rotation thereof. Moreover, the front wall 43 is flanked by a pair of flanking walls 77*a*, 77*b* such that the front wall 43 is inset compared to the pair of flanking walls 77*a*, 77*b*. The pair of flanking walls 77*a*, 77*b* comprise a pair of connector holes 49*c*, 49*d*, which may be configured to accommodate retaining members (not shown), such as screws, etc. for connecting the housing 3 to the housing cover 2 such that flank wall 77*a* comprises connector hole 49*d* and flank wall 77*b* comprises connector hole 49*c*. A hole 76 may be further configured between the pair of connector holes 49*c*, 49*d*. The base portion 44 is positioned under the front wall 43 and the base portion 44 comprises a notch 50. Furthermore, the base portion 44 comprises an inner lip 47. The housing 3 is configured with a plurality of electronics holders 40 to permit engagement, attachment, and securing of various electronic components (not shown in FIGS. 4A through 4F). The housing 3 further comprises a pair of battery slots 90*a*, 90*b* (shown in FIG. 4C) to accommodate batteries (not shown in FIGS. 4A through 4F) for powering the device 100.

FIGS. 4G through 4L, with reference to FIGS. 1A through 4F, are schematic diagrams illustrating the housing 3*x* of the fuel pump assistance device 100*x* of FIGS. 1N through 1V, according to a second embodiment herein. The housing 3*x* comprises a base portion 44 connected to a body portion 45. The base portion 44 may be wider and longer than the body portion 45. The housing 3*x* is configured to fit in the housing cover 2*x* such that the housing 3*x* comprises a cross wall 48 containing a pair of connector holes 49*a*, 49*b* that align with the pair of connector holes 35*a*, 35*b* of the housing cover 2*x* to allow the housing 3*x* to be connected to the housing cover 2*x* using retaining members (not shown), such as screws, etc. The housing 3*x* further comprises a first sidewall 41*a* spaced apart from a second sidewall 41*b* by the cross wall 48. The first sidewall 41*a* and the second sidewall 41*b* each respectively comprise a first extension slot 42*a* and a second extension slot 42*b* such that the cross wall 48 extends between the first extension slot 42*a* and the second extension slot 42*b*. The housing 3*x* also includes a front wall 43*x* that is parallel to the cross wall 48 such that the front wall 43*x* is spaced apart from the cross wall 48 by the first sidewall 41*a* and the second sidewall 41*b*. The front wall 43*x* comprises an aperture 78 that is substantially centrally positioned in the front wall 43*x*. Aperture 78 is configured to accommodate a ball bearing 430 (of FIG. 15) to allow the axle 10 to rotate the cam 5. Disposed within aperture 78 is a hole 46 to accommodate the axle 10. Hole 46 is configured to extend through the housing 3*x* and all the way to the backside 64 of the housing 3*x*. When inserted, the axle 10 also extends through the housing 3*x* in hole 46 all the way to the backside 64 of the housing 3*x* to engage the cam 5 to permit rotation thereof. The front wall 43*x* further comprises a pair of connector holes 49*c*, 49*d*, which may be configured to accommodate retaining members (not shown), such as screws, etc. for connecting the housing 3*x* to the housing cover 2*x*. The base portion 44 is positioned under the front wall 43*x*. Furthermore, the base portion 44 comprises an inner lip 47. The housing 3*x* is configured with a plurality of electronics holders 40 to permit engagement, attachment, and securing of various electronic components (not shown in FIGS. 4G through 4L). The housing 3*x* further comprises a battery slot 90 (shown in FIG. 4J) disposed through the second sidewall 41*b* to accommodate batteries (not shown) for powering the device 100*x*. Moreover, a charging cap 4*x* is removably attached to the housing 3*x*. The charging cap 4*x* is configured to cover a charging port to accommodate a corresponding wire (not shown) for supplying power for the battery (not shown in FIGS. 4G through 4L).

FIGS. 5A through 5D, with reference to FIGS. 1A through 4L, are schematic diagrams illustrating the charging cap 4, 4*x* of the fuel pump assistance device 100, 100*x* of FIGS. 1A through 1V, according to the embodiments herein. The charging cap 4, 4*x* comprises a body 58 with a connected cap 59. The body 58 comprises a front side 51 and an oppositely positioned back side 52 such that the cap 59 extends from the back side 52 of the body 58. The charging cap 4, 4*x* further comprises an aperture 53 that extends through the body 58 and through a substantial portion of the cap 59 but does not fully extend through the entire thickness of the cap 59 such that the cap 59 comprises a closed back wall 57. The front part 54 of the aperture 53 extends through an entire thickness of the body 58. The back part 55 of the aperture 53 extends in an elongated manner such that the pack part 55 of the aperture 53 is longer than the front part 55 of the aperture 53. The body 58 further comprises elongated ends 56 that extend past the length of the cap 59. The charging cap 4, 4*x* is positioned on the backside 64 of the housing 3, 3*x* (shown in FIGS. 4C, 4F, and 4I). Furthermore, the charging cap 4, 4*x* is configured to be removably attached to the housing 3, 3*x* for easy access to a charging port 65 (shown in FIG. 4C).

FIGS. 6A through 6D, with reference to FIGS. 1A through 5D, are schematic diagrams illustrating the cam 5 of the fuel pump assistance device 100, 100*x* of FIGS. 1A through 1V, according to the embodiments herein. The cam 5 comprises a knob-like body 66 comprising a curved upper portion 67 and an oppositely positioned flat lower portion 68. The body 66 comprises a sidewall surface 69 through which are configured with a pair of connector holes 70*a*, 70*b*. A channel 71 is configured from the flat lower portion 68 upwards through the body 66 towards the curved upper portion 67 but does not extend entirely through the curved upper portion 67. The channel 71 is configured to accommodate the axle 10 (shown in FIGS. 1G and 1S) and is held in place by a plurality of retaining members (not shown), such as screws, etc. that are set in the pair of connector holes 70*a*, 70*b*. In this regard, the axle 10 may also contain holes that align with the pair of connector holes 70*a*, 70*b* to allow the retaining members to fixably attach to the axle 10 to create an axle-stopper mechanism for the cam 5. When the first button 1 is pressed, the second button 17 on the inner surface 16 is toggled and remains in that position, which turns the cam 5 from its resting position of 0° to the engaged position of 90°, which begins the gas pumping process, until the first button 1 is pressed again which returns the cam 5 to its resting position.

The pair of connector holes 70*a*, 70*b* may be positioned on the sidewall surface 69 of the cam 5 to align precisely with corresponding holes in the axle 10. When the retaining members (not shown), such as self-tapping screws, etc., are inserted through these aligned holes, they create a robust mechanical coupling that prevents any slippage between the cam 5 and the axle 10. This axle-stopper mechanism ensures that the rotational force from the second gear 7 is efficiently transferred to the cam 5 without any power loss. The depth and diameter of the channel 71 are specifically configured to accommodate the axle 10 with minimal clearance, providing additional stability and preventing wobbling during operation. This configuration ensures consistent performance during the critical rotation of the cam 5 from the resting position to the engaged position, even under the substantial load created when the cam 5 presses against the squeeze lever 302.

FIGS. 7A through 7D, with reference to FIGS. 1A through 6D, are schematic diagrams illustrating the first gear 6 of the fuel pump assistance device 100, 100*x* of FIGS. 1A through 1V, according to the embodiments herein. In an example, the first gear 6 may be configured as a 12-tooth gear, although other configurations are possible. The first gear 6 comprises a plurality of gear teeth 61*x*, a block hole 62, and a gear hole 63 such that the block hole 62 and the gear hole 63 are longitudinally aligned to each other.

FIGS. 8A through 8D, with reference to FIGS. 1A through 7D, are schematic diagrams illustrating the second gear 7 of the fuel pump assistance device 100, 100*x* of FIGS. 1A through 1V, according to the embodiments herein. In an example, the second gear 7 may be configured as a 36-tooth gear, although other configurations are possible. The second gear 7 comprises a plurality of gear teeth 72*x*, a first side 74 and a second side 75 with a gear hole 73 extending from the first side 74 to the second side 75.

FIGS. 9A through 9D, with reference to FIGS. 1A through 8D, are schematic diagrams illustrating the back cover 8 of the fuel pump assistance device 100 of FIGS. 1A through 1M, according to a first embodiment herein. The back cover 8 comprises an elongated portion 81 with a stem 82 transversely extending from the elongated portion 81. The elongated portion 81 comprises a first surface 84 and an oppositely positioned second surface 85. Moreover, a spacer 89 is positioned on a portion of the second surface 85 with a lip 86 attached to the spacer 89 such that the stem 82 extends from the lip 86. Accordingly, the spacer 89 is positioned between the second surface 85 of the elongated portion 81 and the lip 86. The stem 82 comprises a thin extender 87 that extends from the lip 86 and the stem 82 further comprises a thick block anchor 88 connected to end of the think extender 87. A hole 83 is configured through the thick block anchor 88. The hole 83 aligns with hole 76 (shown in FIG. 4B) of the housing 3 when the back cover 8 is attached to the housing 3 such that the holes 76, 83 are configured to accommodate a retaining member (not shown), such as a screw, etc. to allow the back cover 8 to connect to the housing 3.

FIGS. 9E through 9I, with reference to FIGS. 1A through 9D, are schematic diagrams illustrating the back cover 8*x* of the fuel pump assistance device 100*x* of FIGS. 1N through 1V, according to a second embodiment herein. The back cover 8*x* comprises an elongated portion 81. The elongated portion 81 comprises a first surface 84 and an oppositely positioned second surface 85. Moreover, a spacer 89 is positioned on a portion of the second surface 85 with a lip 86 attached to the spacer 89 such that the stem 82 extends from the lip 86. Accordingly, the spacer 89 is positioned between the second surface 85 of the elongated portion 81 and the lip 86. A hole 96 is configured through the elongated portion 81.

Figure 10A:
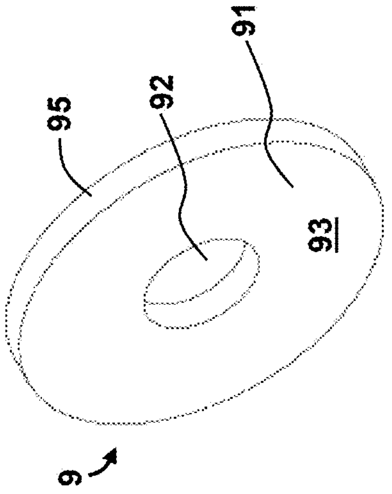
FIGS. 10A through 10C are schematic diagrams illustrating a washer of the fuel pump assistance device of FIGS. 1A through 1V, according to the embodiments herein.
Figure 10C:
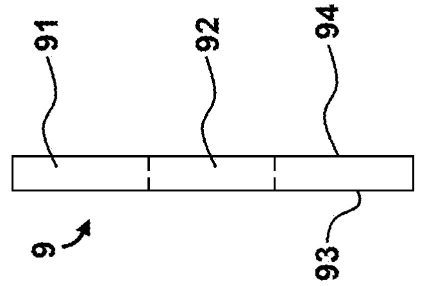
Figure 10B:
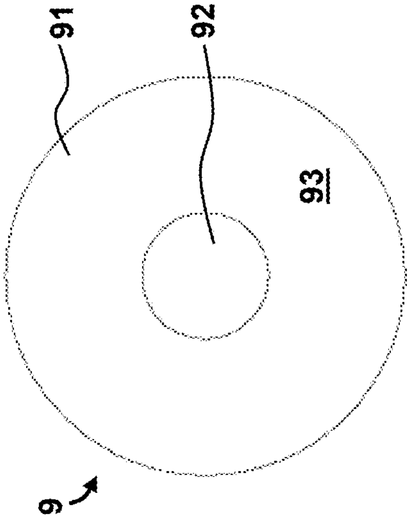

FIGS. 10A through 10C, with reference to FIGS. 1A through 91, are schematic diagrams illustrating the washer 9 of the fuel pump assistance device 100, 100*x* of FIGS. 1A through 1V, according to the embodiments herein. The device 100, 100*x* comprises a pair of washers 9 to provide for the suitable engagement of retaining members (not shown), such as screws, etc. to connect the housing cover 2, 2*x* to the housing 3, 3*x*. Each washer 9 comprises a body 91 with a hole 92 configured therethrough. Moreover, each washer 9 comprises a first surface 93 and an oppositely positioned second surface 94 that are separated by a sidewall 95 running along a circumference of the washer 9.

Figure 11:
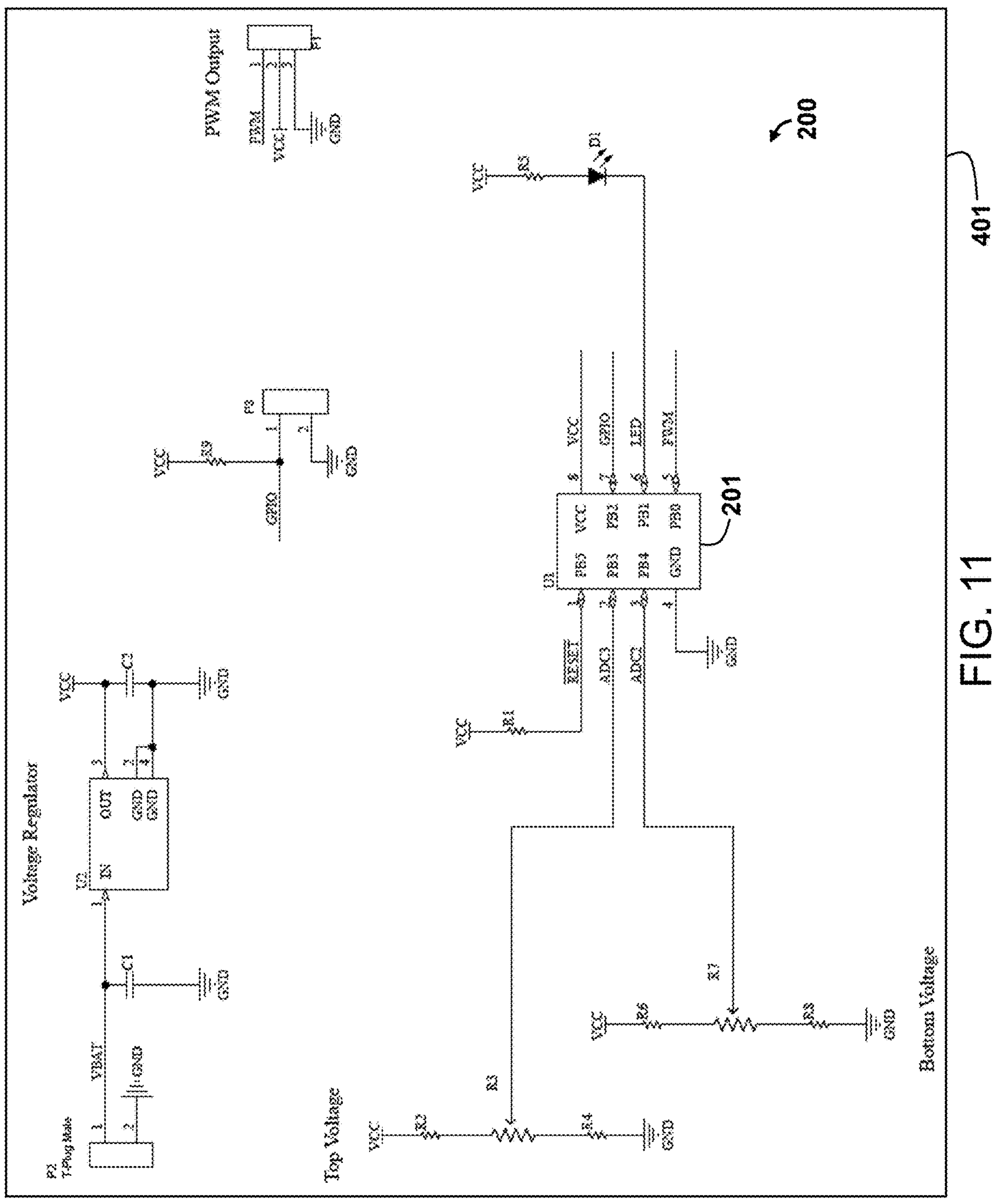
FIG. 11 is an electrical circuit diagram, according to the embodiments herein.

FIG. 11, with reference to FIGS. 1A through 10C, is an electrical circuit diagram, according to the embodiments herein. The electrical circuit 200 shown in FIG. 11 may be provided on a printed circuit board (PCB), according to an example. As such, the electrical circuit diagram represents a Pulse Width Modulation (PWM) circuit 200 that controls a servo motor 403 (shown in FIG. 12) based on user input.

Power Supply:

The circuit 200 is powered by at least one battery 402 (shown in FIG. 12) connected to the P2 connector (T-Plug Male, for example). The positive terminal of the battery (VBAT) is connected to the input pin (IN) of the voltage regulator U2, while the negative terminal (GND) is connected to the ground.

Voltage Regulator (U2):

The voltage regulator U2 takes the input voltage from the battery (VBAT) and regulates it to a stable voltage output (VCC). In an example, the voltage output may be 5V. The voltage regulator U2 ensures that the circuit components receive a constant voltage supply, regardless of fluctuations in the battery voltage. Capacitors C1 and C2 help to filter out noise and stabilize the regulated voltage.

Microcontroller (U1):

The microcontroller (U1) 201 receives the regulated stable voltage (VCC) and ground (GND) connections. The microcontroller 201 reads the state of the GPIO pin (connected to P3) to determine the user input.

User Input (P3 and R9):

The user input is connected to the P3 connector. When the second button 17 is pressed (i.e., due to pressing of the first button 1), the second button 17 pulls the GPIO pin low (GND). Resistor R9 is a pull-up resistor that ensures the GPIO pin remains at a high state (VCC) when the first button 1 (and second button 17) is not pressed.

LED Indication (D1 and R5):

An LED (D1) is connected to the LED pin of the microcontroller 201 through a current-limiting resistor R5. The microcontroller 201 can turn the LED on or off to provide visual feedback or indication of use.

Servo Motor Control (P1):

The servo motor 403 is connected to the P1 connector. The microcontroller 201 generates a PWM signal on the PWM pin, which is connected to the control pin of the servo motor 403. The PWM signal determines the position of the servo motor 403. The power and ground of the servo motor 403 are connected to VCC and GND, respectively.

Voltage Divider (R3, R4, R6, R7):

The circuit 200 further includes a voltage divider formed by resistors R3, R4, R6, and R7. This voltage divider provides two different voltage levels (Top Voltage and Bottom Voltage) that can be used for analog sensing or comparison, for example.

Reset Pin (R1):

Resistor R1 is connected between the RESET pin of the microcontroller 201 and VCC. This pull-up resistor ensures that the RESET pin remains at a high state, preventing unintentional resets of the microcontroller 201.

When the user presses the first button 1 (which engages the second button 17) connected to P3, it pulls the GPIO pin low. The microcontroller 201 detects this change and generates the appropriate PWM signal on the PWM pin. The PWM signal is sent to the servo motor 403 through the P1 connector, controlling its position. The microcontroller 201 can also turn the LED (D1) on or off to provide visual feedback the user. The voltage regulator (U2) continuously provides a stable voltage supply to the microcontroller 201 and other electrical components in the circuit 200, ensuring proper operation of the circuit 200. The PWM circuit 200 allows the user to control the servo motor 403 using a simple button input, making it suitable for various applications where precise servo control is required.

Figure 12:
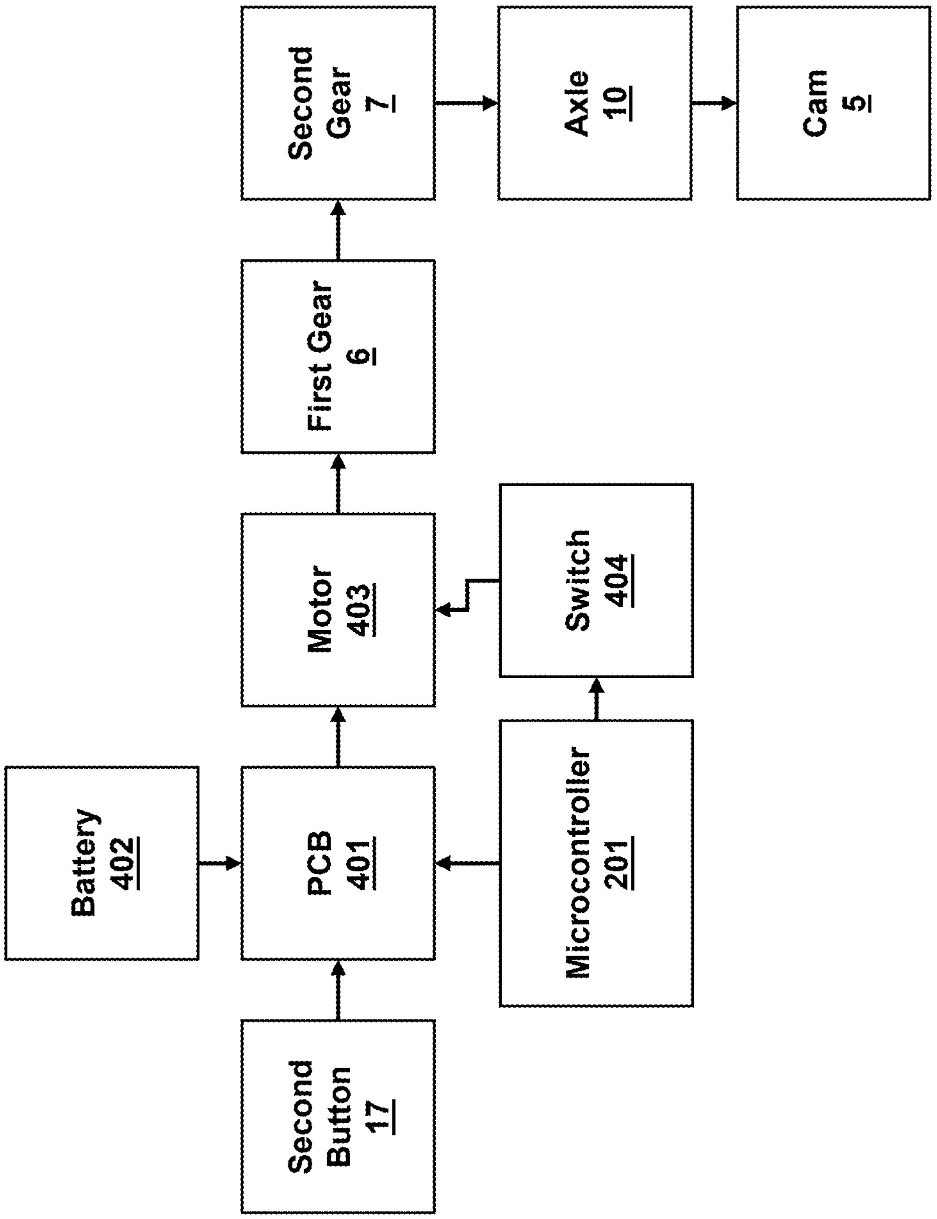
FIG. 12 is a system block diagram, according to the embodiments herein.

FIG. 12, with reference to FIGS. 1A through 1I, is a system block diagram, according to the embodiments herein. As shown, the second button 17 is operatively connected to a PCB 401, which may contain the electrical circuit 200 of FIG. 11. The PCB 401 may be powered by at least one battery 402. In an example, the at least one battery 402 may be lithium-ion polymer (LiPo) batteries, although other types of batteries may also be used in accordance with the embodiments herein. The PCB 401 is then operatively connected to a servo motor 403 in the housing 3, 3*x*. The servo motor 403 then drives the first gear 6 which turns the second gear 7, creating a 1:3 gear ratio when the first gear 6 is configured as a 12-tooth gear and the second gear 7 is configured as a 36-tooth gear. The axle 10, which may be configured as a ¼ inch steel axle, although other configurations are possible, is fixed to the second gear 7 and the cam 5. The PCB 401 may utilize a microcontroller 201 to command the servo motor 403 to switch between two preset positions: pump and stop. This configuration is different from a servo tester as the embodiments herein do not use a variable resistor, but instead comprise the first button 1 and second button 17 that changes between the two preset positions.

The 1:3 gear ratio may be selected to optimize the torque-speed relationship required for the rotational operation of the device 100, 100*x*. For example, this ratio provides three times the torque at the cam 5 compared to what the servo motor 403 delivers directly, which helps in overcoming the resistance of the squeeze lever 302 required for activation. The higher torque enables the device 100, 100*x* to operate effectively even if the gas pump handle 300 has stiffer springs or resistance. Additionally, the gear reduction decreases the rotational speed of the cam 5 to approximately one-third of the output speed of the server motor 403, ensuring smooth, controlled movement that prevents any sudden jerking motion that could dislodge the device 100, 100*x* from the gas pump handle 300. The 12-tooth and 36-tooth configuration for the first gear 6 and second gear 7, respectively, may be specifically chosen because it provides a good balance between compact design and mechanical advantage while maintaining precision during the critical 90-degree rotation of the cam 5.

The microcontroller 201 may be any suitable type of microcontroller utilizing microchip technology. For example, the microcontroller 201 may be a semiconductor-based microprocessor, field-programmable gate array (FPGA), hardware engine, hardware pipeline, and/or other hardware-enabled device suitable for receiving, processing, operating, and performing various functions for the device 100, 100*x*. Furthermore, in some examples, the microcontroller 201 may include switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

The housing 3, 3*x* contains all of the electronics, including the at least one battery 402, servo motor 403, PCB 401, charging port 65, on-off switch 404, and the gears 6, 7. The at least one battery 402 may fit in the pair of battery slots 90*a*, 90*b* (shown in FIG. 4C) in the housing 3. Moreover, the at least one battery 402 may fit in the battery slot 90 (shown in FIG. 4J) in the housing 3*x*. The PCB 401 may be placed into the front section of the housing 3 next to the notch 50 at the bottom (base portion 44) of the housing 3, which serves as the battery charger port location, which is covered by the charging cap 4. Alternatively, the PCB 401 may be placed into the front section of the housing 3*x* at the bottom (base portion 44) of the housing 3*x*, which serves as the battery charger port location, which is covered by the charging cap 4*x*. The back cover 8, 8*x* provides easy access to the servo motor 403 and gears 6, 7 while creating a bar that restricts the ability of the entire unit to rotate about the axle 10.

Figure 13A:
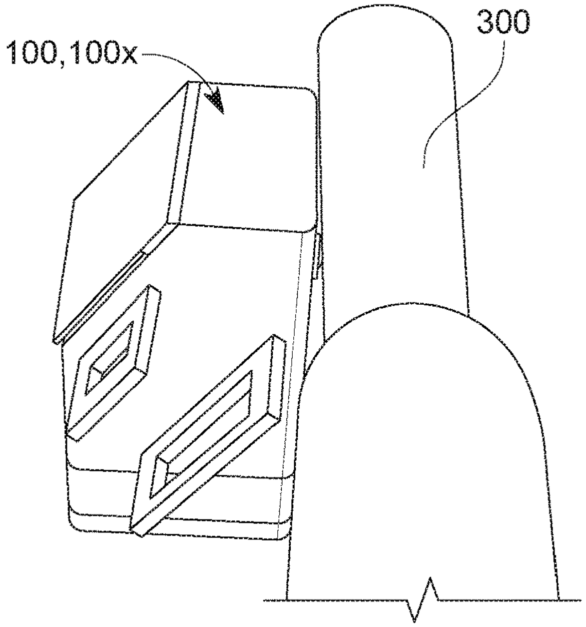
FIGS. 13A through 13C are images of the fuel pump assistance device of FIGS. 1A through 1V attached to a gas pump handle, according to the embodiments herein.
Figure 13B:
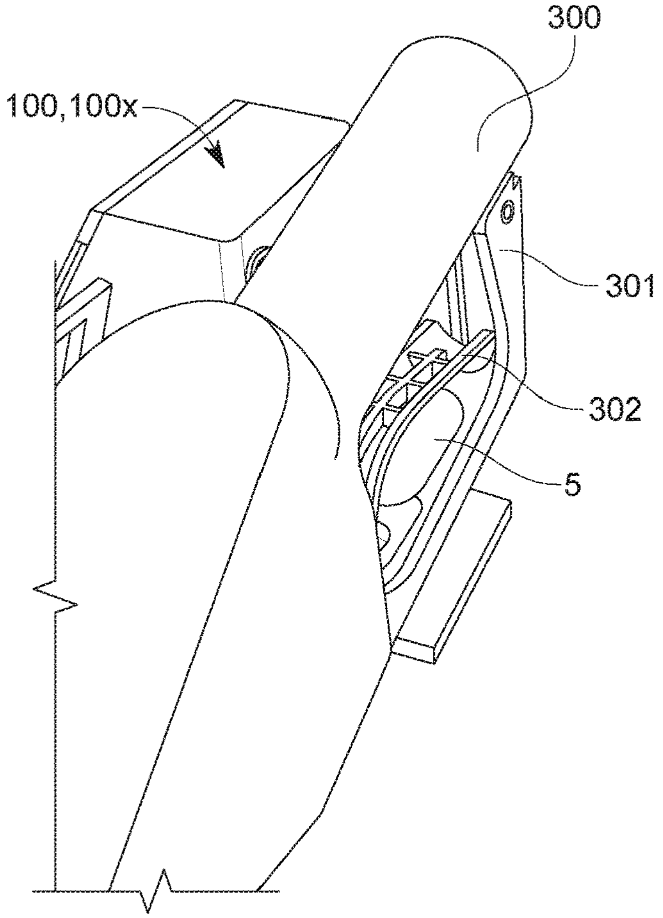
Figure 13C:
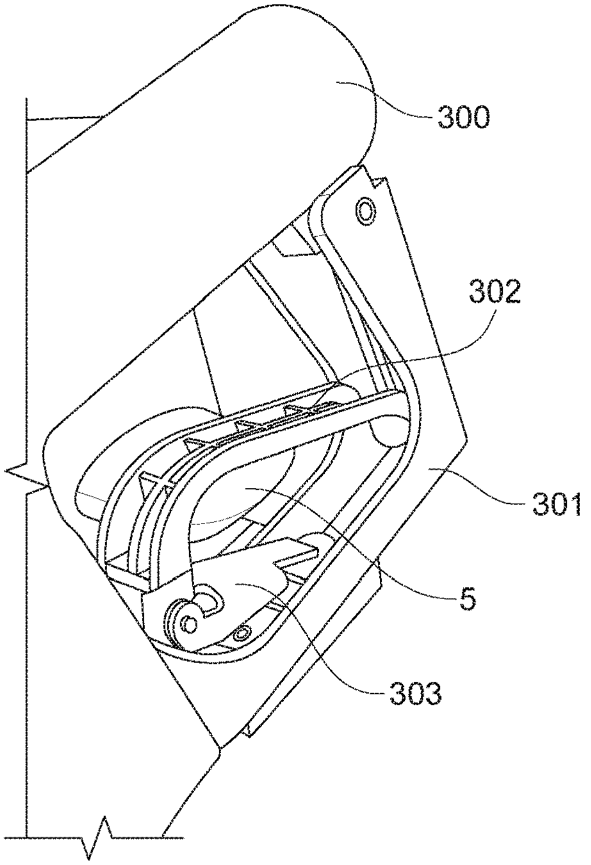

FIGS. 13A through 13C, with reference to FIGS. 1A through 12, are images of the fuel pump assistance device 100, 100*x* of FIGS. 1A through 1V attached to a gas pump handle 300, according to the embodiments herein. The gas pump handle 300 may typically comprise a handle frame 301 and a squeeze lever 302. It is the squeeze lever 302 that triggers the flow of gas and for which those with diminished hand strength, such as hand arthritis sufferers, it is the squeezing of this squeeze lever 302 that often proves to be challenging and for which the device 100, 100*x* is aimed to provide an automatic squeezing function and requires little force by the user other than pushing the relatively large and flexible easy-to-press first button 1. The cam 5 of the device 100, 100$x$ is configured to fit between the squeeze lever 302 and the gas handle catch 303. Typically, when an individual is pumping gas, the gas handle catch 303 is raised to retain the squeeze lever 302 in its fully engaged position to permit the flow of gas to continue without the user having to keep the squeeze lever 302 squeezed for the entire duration of the gas pumping process. However, sometimes, the gas handle catch 303 malfunctions and does not fully engage the squeeze lever 302 (i.e., slips) thereby requiring the user to continuously squeeze the squeeze lever 302 for the gas to pump. Obviously, for someone with arthritic hands, this may prove to be extremely painful and perhaps impossible to accomplish. Thus, the device 100, 100$x$ provided by the embodiments herein substitutes the manual squeezing of the squeeze lever 302 and with the rotation of the cam 5, the device 100, 100$x$ retains the squeeze lever 302 in the fully engaged position until the gas tank is full (or the desired amount of gas is dispensed).

Figure 14A:
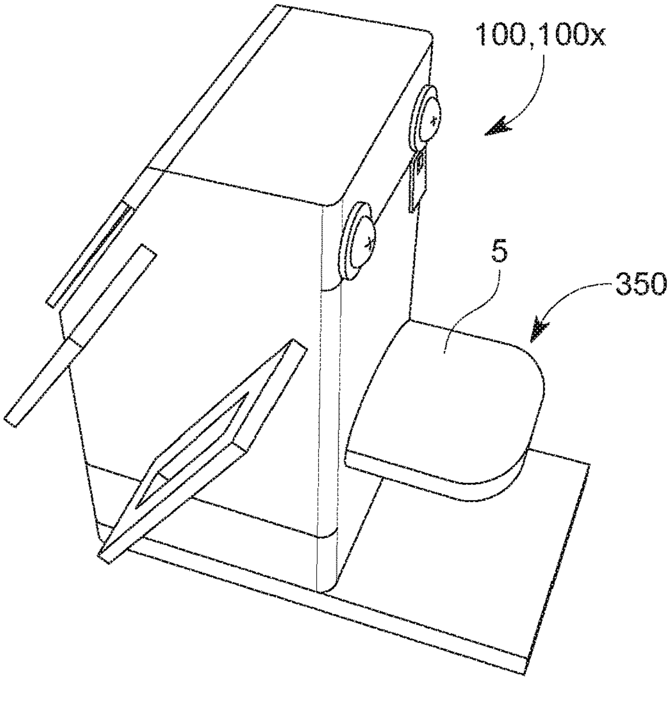
FIGS. 14A through 14C are images of the fuel pump assistance device of FIGS. 1A through 1V, according to the embodiments herein.
Figure 14B:
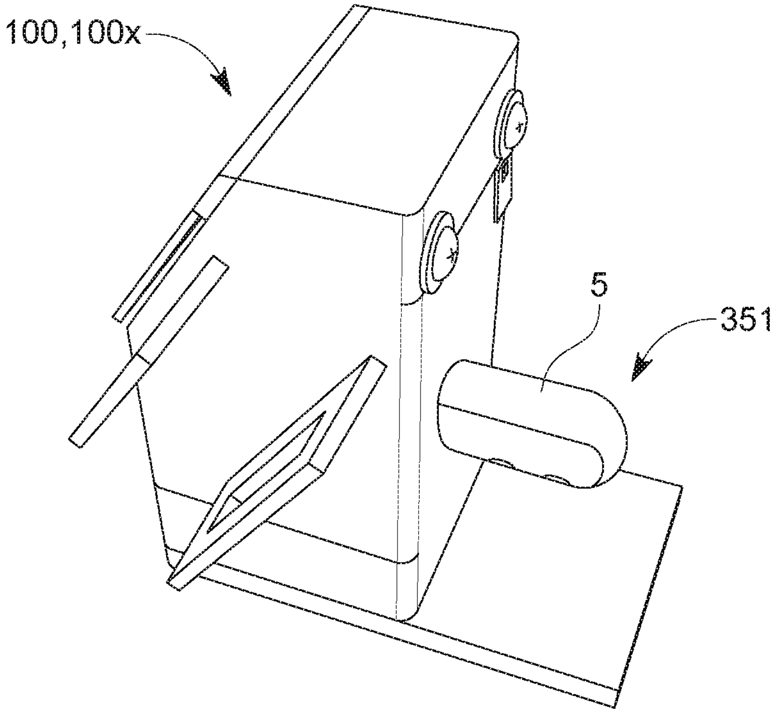
Figure 14C:
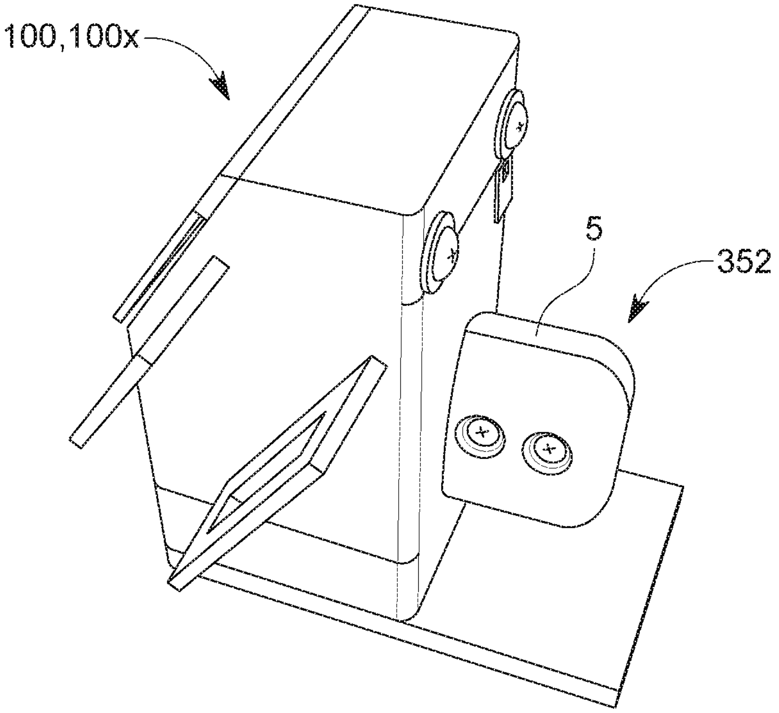

FIGS. 14A through 14C, with reference to FIGS. 1A through 13C, are images of the fuel pump assistance device 100, 100$x$ of FIGS. 1A through 1V, according to the embodiments herein. FIG. 14A illustrates the cam 5 in the unlocked, resting position 350 (0°). It is in this resting position 350 that the device 100, 100$x$ is first engaged to the gas pump handle 300 with the cam 5 inserted between the squeeze lever 302 and the gas handle catch 303. FIG. 14B illustrates the cam 5 in an intermediate position 351 (e.g., approximately 45°). It is in this intermediate position 351 in which the cam 5 begins to squeeze the squeeze lever 302. FIG. 14C illustrates the cam 5 in the fully engaged, locked position 352 (90°). It is in this locked (engaged) position 352 in which the cam 5 fully squeezes the squeeze lever 302 against the gas pump handle 300 to allow for the full flow of gas, and all without requiring a user to squeeze the squeeze lever 302. When the device 100, 100$x$ is activated by the user pressing the first button 1, the rotation cam 5 exerts a moment on the squeeze lever 302 resulting in a frictional force that keeps the device 100, 100$x$ attached to the gas pump handle 300 and the handle frame 301 regardless of orientation, thereby allowing the user to let go of the device 100, 100$x$ while gas is being pumped.

Figure 15:
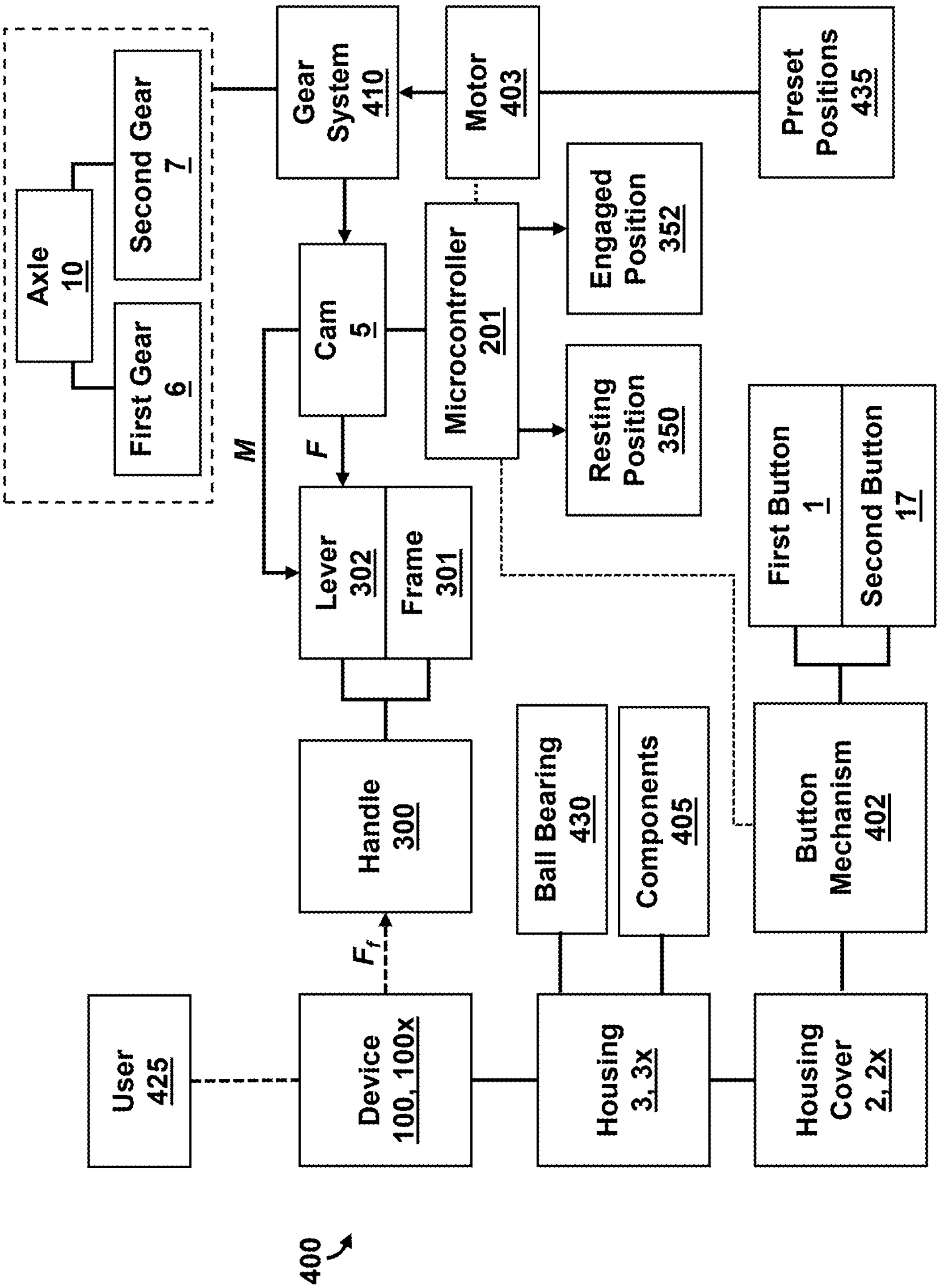
FIG. 15 is a block diagram of a system for assisting with pumping fuel, according to the embodiments herein.

FIG. 15, with reference to FIGS. 1A through 14C, illustrates a block diagram of a system 400 for assisting with pumping fuel, the system 400 comprising: a fuel pump assistance device 100, 100$x$ configured to be removably attached to a gas pump handle 300 having a squeeze lever 302 and a handle frame 301, the fuel pump assistance device 100, 100$x$ comprising: a housing 3, 3$x$ containing electronic components 405; a housing cover 2, 2$x$ attached to the housing 3, 3$x$; a button mechanism 402 comprising a first button 1 on an exterior of the housing cover 2, 2$x$ and a second button 17 positioned inside the housing cover 2, 2$x$ and actuated by the first button 1; a rotatable cam 5 driven by a servo motor 403 via a gear system 410, the cam 5 configured to apply force F to the squeeze lever 302 of the gas pump handle 300 when rotated to an engaged position 352; and a microcontroller 201 configured to control rotation of the cam 5 between a resting position 350 and the engaged position 352 in response to actuation of the button mechanism 402.

With reference to FIGS. 1A through 14C, the gear system 410 may comprise a first gear 6, a second gear 7, and an axle 10. As provided in FIG. 15, the rotatable cam 5 may be configured to exert a moment M on the squeeze lever 302 resulting in a frictional force $F_f$ that keeps the fuel pump assistance device 100, 100$x$ attached to the gas pump handle 300 regardless of orientation, thereby allowing a user 425 to let go of the fuel pump assistance device 100, 100$x$ while fuel is being pumped. The housing 3, 3$x$ may comprise a front wall 43, 43$x$ having an aperture 78 substantially centrally positioned in the front wall 43, 43$x$, the aperture 78 configured to accommodate a ball bearing 430 to allow an axle 10 to rotate the cam 5, and wherein the housing 3, 3$x$ may further comprise a cross wall 48 containing a pair of connector holes 49$a$, 49$b$ that align with corresponding connector holes 35$a$, 35$b$ of the housing cover 2, 2$x$ to allow connection of the housing 3, 3$x$ to the housing cover 2, 2$x$.

Again with reference to FIGS. 1A through 14C, the first button 1 may comprise an outer surface 15 containing an engagement position 18 with raised members, an inner surface 16 with the second button 17 positioned to substantially align with the engagement position 18, and wherein the inner surface 16 is substantially partitioned into a plurality of portions comprising a thin portion 20, a thick portion 21, and an intermediate portion 19 with the second button 17 positioned in the intermediate portion 19. The cam 5 may be configured to be positioned between the squeeze lever 302 and the gas handle catch 303 of the gas pump handle 300, and wherein the cam 5 may comprise a knob-like body 66 having a curved upper portion 67 and an oppositely positioned flat lower portion 68 with a channel 71 configured from the flat lower portion 68 upwards through the body 66. As indicated in FIG. 15, the microcontroller 201 may be configured to command the servo motor 403 to switch between preset positions 435 in response to a push-push activation of the button mechanism 402. The electronic components 405 may further comprise the battery 402, the servo motor 403, the PCB 401, the charging port 65 covered by the removable charging cap 4, 4$x$, and the on-off switch 404. The housing 3, 3$x$ comprises a charging cap 4, 4$x$ removably attached to the housing 3, 3$x$ to cover the charging port 65.

Figure 16A:
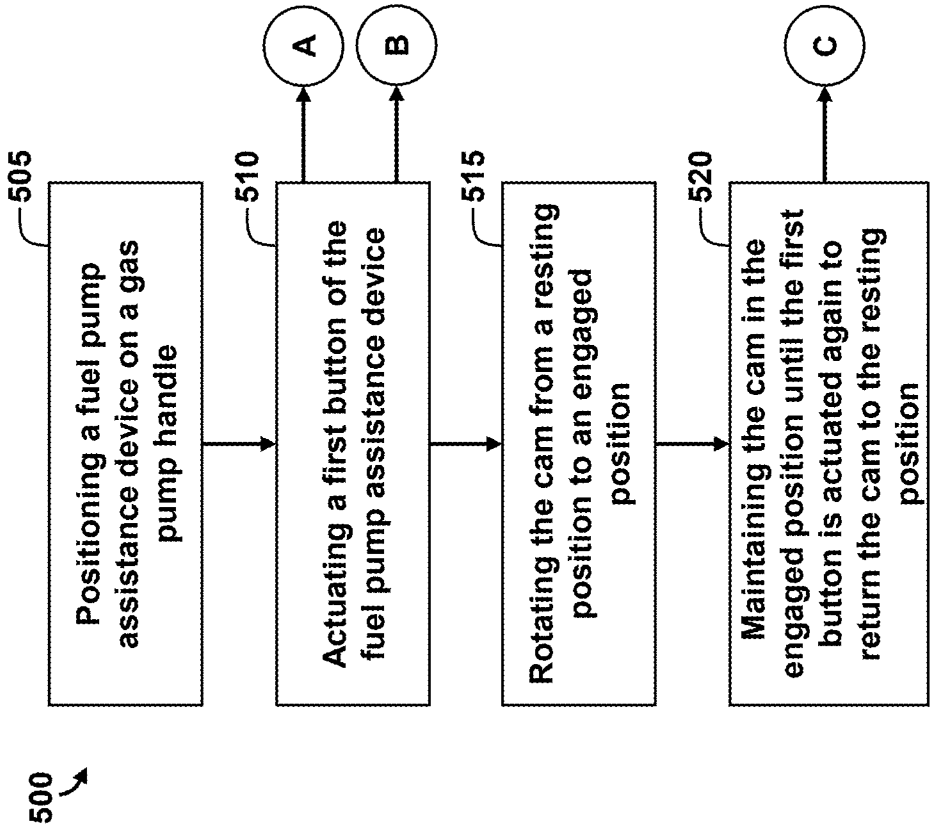
FIG. 16A is a flow diagram illustrating an automated method for pumping fuel, according to the embodiments herein.

FIGS. 16A through 16D, with reference to FIGS. 1A through 15, are flow diagrams illustrating an automated method 500 for pumping fuel. As shown in FIG. 16A, the method 500 comprises positioning (505) a fuel pump assistance device 100, 100$x$ on a gas pump handle 300 such that a cam 5 of the fuel pump assistance device 100, 100$x$ is located between a squeeze lever 302 and a handle frame 301 of the gas pump handle 300; actuating (510) a first button 1 of the fuel pump assistance device 100, 100$x$ to toggle a second button 17 positioned inside the fuel pump assistance device 100, 100$x$; rotating (515) the cam 5 from a resting position 350 to an engaged position 352 via a servo motor 403 and gear system 410 in response to the actuation of the second button 17, wherein the rotation (515) of the cam 5 applies a force F to the squeeze lever 302 to enable fuel flow; and maintaining (520) the cam 5 in the engaged position 352 until the first button 1 is actuated again to return the cam 5 to the resting position 350.

Figure 16B:
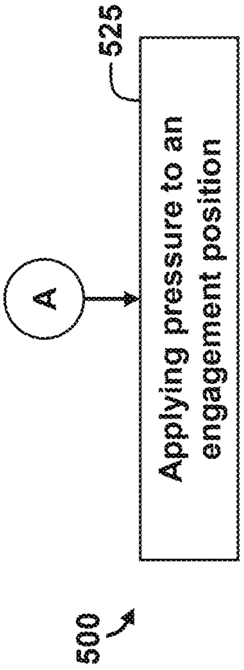
FIG. 16B is a flow diagram illustrating a technique for actuating a first button of the fuel pump assistance device of FIGS. 1A through 1V, according to the embodiments herein.
Figure 16C:
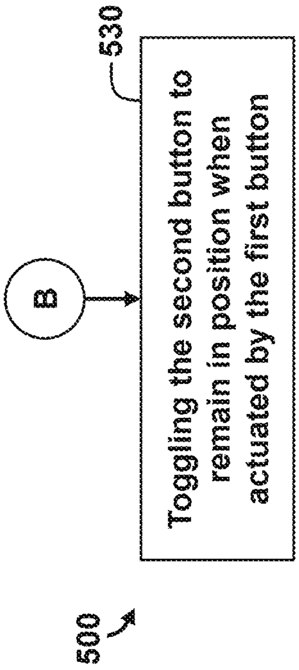
FIG. 16C is a flow diagram illustrating a technique for switching a second button of the fuel pump assistance device of FIGS. 1A through 1V between two preset positions, according to the embodiments herein.

The first button 1 may comprise a flexible material configured to bend when pressed, and wherein actuating (510) the first button 1 may comprise applying (525) pressure, as shown in FIG. 16B, to an engagement position 18 on an outer surface 15 of the first button 1 such that the flexible material bends and causes an inner surface 16 of the first button 1 to actuate the second button 17 without requiring continuous pressing from the user 425. As shown in FIG. 16C, the method 500 may comprise toggling (530) the second button 17 to remain in position when actuated by the first button 1, wherein the toggling (530) switches the second button 17 between two preset positions to control actuation of the servo motor 403 and rotation of the cam 5.

Figure 16D:
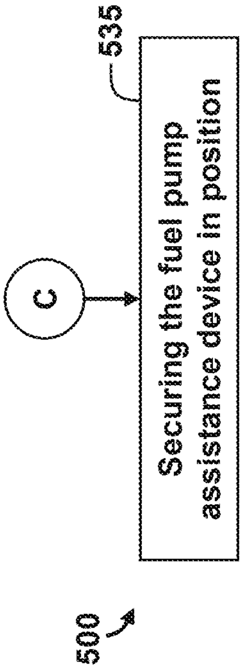
FIG. 16D is a flow diagram illustrating a technique for operating the fuel pump assistance device of FIGS. 1A through 1V, according to the embodiments herein.

As shown in FIG. 16D, the method 500 may comprise securing (535) the fuel pump assistance device 100, 100*x* in position via interaction between a back cover 8, 8*x* and a housing 3, 3*x* of the fuel pump assistance device 100, 100*x*, wherein the back cover 8, 8*x* may comprise an elongated portion 81 with a spacer 89 and a lip 86 that creates a structural support to prevent the fuel pump assistance device 100, 100*x* from rotating about an axle 10 when the cam 5 exerts force F on the squeeze lever 302 of the gas pump handle 300. Rotating (515) the cam 5 may comprise rotating the cam 5 ninety degrees (90°) from the resting position 350 to the engaged position 352, and wherein rotating the cam 5 may comprise transmitting power from the servo motor 403 through a first gear to a second gear connected to the cam 5 via an axle 10. The rotation (515) of the cam 5 may create a frictional force $F_f$ between the cam 5 and the squeeze lever 302 that retains the fuel pump assistance device 100, 100*x* on the gas pump handle 300 without requiring the user 425 to hold the fuel pump assistance device 100, 100*x*, thereby allowing the user 425 to disengage from the fuel pump assistance device 100, 100*x* while fuel is being pumped.

The embodiments herein provide significant enhancements over conventional gas pumping methods. The fuel pump assistance device 100, 100*x* enables a user 425 with limited hand strength or arthritis to independently pump fuel without pain or difficulty. By employing a push-button mechanism 402 with the first button 1 and second button 17, a user 425 can easily trigger the servo motor 403 to rotate the cam 5 from its resting position 350 to its engaged position 352, applying the necessary force F to the squeeze lever 302 of the gas pump handle 300. The frictional force $F_f$ created between the cam 5 and the squeeze lever 302 securely holds the device 100, 100*x* in place, allowing a user 425 to disengage from the squeezing process while fuel is being pumped. The back cover 8, 8*x* with its elongated portion 81, spacer 89, and lip 86 provides the structural support to prevent unwanted rotation about the axle 10. Additionally, the gear system 410 with its 1:3 ratio between the first gear 6 and second gear 7 ensures efficient power transfer from the servo motor 403 to the cam 5. With its compact housing 3, 3*x*, rechargeable battery 402, and automated operation, the device 100, 100*x* promotes independence and autonomy for individuals who might otherwise require assistance at gas stations, thereby significantly improving their quality of life through enhanced mobility.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed utilized herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A fuel pump assistance device comprising:
   - a housing containing electronic components and a gear system;
   - a housing cover attached to the housing;
   - a first button attached to the housing cover;
   - a second button positioned inside the housing cover and actuated by the first button;
   - a cam operatively connected to the gear system;
   - a servo motor controlled by a printed circuit board (PCB) and configured to rotate the cam via the gear system between a resting position and an engaged position in response to actuation of the second button; and
   - a back cover operatively connected to the housing and configured to restrict rotation of the device about an axle connected to the cam.

2. The device of claim 1, wherein the first button comprises a flexible material with an outer surface containing an engagement position and an inner surface comprising the second button, and wherein the inner surface is substantially aligned with the engagement position of the outer surface.

3. The device of claim 1, wherein the housing comprises a base portion operatively connected to a body portion, wherein the base portion comprises a notch configured to accommodate a charging port, and wherein the body portion comprises a plurality of holders to secure the electronic components within the housing.

4. The device of claim 1, wherein the housing cover comprises a pair of sidewalls spaced apart by a back wall, an angled wall, a front wall, and a top wall, wherein the angled wall comprising a hole configured to engage the second button, and wherein each of the pair of sidewalls comprises at least one elongated slotted tab extending outwardly for attachment to the housing.

5. The device of claim 1, wherein the back cover comprises an elongated portion with a spacer positioned on a portion of a second surface of the elongated portion and a lip attached to the spacer, and wherein the back cover is configured to attach to the housing to provide access to the electronic components while creating a bar that restricts rotation of the device about the axle.

6. The device of claim 1, wherein the cam is configured to rotate 90 degrees from the resting position to the engaged position when the first button is pressed, and wherein the cam comprises a body having a curved upper portion and an oppositely positioned flat lower portion, with a channel configured to accommodate the axle.

7. The device of claim 1, wherein the gear system comprises a first gear operatively connected to the servo motor and a second gear operatively connected to the first gear, wherein the second gear is connected to the cam via the axle, and wherein the PCB comprises a microcontroller configured to command the servo motor to switch between preset positions based on a state of the second button.

8. The device of claim 1, wherein the housing cover comprises an elongated member configured to align with an elongated tab of the first button.

9. A system for assisting with pumping fuel, the system comprising:
   - a fuel pump assistance device configured to be removably attached to a gas pump handle having a squeeze lever and a handle frame, the fuel pump assistance device comprising:
     - housing containing electronic components;
     - a housing cover attached to the housing;
     - a button mechanism comprising a first button on an exterior of the housing cover and a second button positioned inside the housing cover and actuated by the first button;
     - a rotatable cam driven by a servo motor via a gear system, the cam configured to apply force to the squeeze lever of the gas pump handle when rotated to an engaged position; and a microcontroller configured to control rotation of the cam between a resting position and the engaged position in response to actuation of the button mechanism.

10. The system of claim 9, wherein the rotatable cam is configured to exert a moment on the squeeze lever resulting in a frictional force that keeps the fuel pump assistance device attached to the gas pump handle regardless of orientation, thereby allowing a user to let go of the fuel pump assistance device while fuel is being pumped.

11. The system of claim 9, wherein the housing comprises a front wall having an aperture substantially centrally positioned in the front wall, the aperture configured to accommodate a ball bearing to allow an axle to rotate the cam, and wherein the housing further comprises a cross wall containing a pair of connector holes that align with corresponding connector holes of the housing cover to allow connection of the housing to the housing cover.

12. The system of claim 9, wherein the first button comprises an outer surface containing an engagement position with raised members, an inner surface with the second button positioned to substantially align with the engagement position, and wherein the inner surface is substantially partitioned into a plurality of portions comprising a thin portion, a thick portion, and an intermediate portion with the second button positioned in the intermediate portion.

13. The system of claim 9, wherein the cam is configured to be positioned between the squeeze lever and a gas handle catch of the gas pump handle, and wherein the cam comprises a knob-like body having a curved upper portion and an oppositely positioned flat lower portion with a channel configured from the flat lower portion upwards through the body.

14. The system of claim 11, wherein the micro controller is configured to command the servo motor to switch between preset positions in response to a push-push activation of the button mechanism, wherein the electronic components further comprise a battery, the servo motor, a printed circuit board (PCB), a charging port covered by a removable charging cap, and an on-off switch, and wherein the housing comprises a charging cap removably attached to the housing to cover the charging port.

15. An automated method for pumping fuel, the method comprising:

positioning a fuel pump assistance device on a gas pump handle such that a cam of the fuel pump assistance device is located between a squeeze lever and a handle frame of the gas pump handle;

actuating a first button of the fuel pump assistance device to toggle a second button positioned inside the fuel pump assistance device;

rotating the cam from a resting position to an engaged position via a servo motor and gear system in response to the actuation of the second button, wherein the rotation of the cam applies a force to the squeeze lever to enable fuel flow; and maintaining the cam in the engaged position until the first button is actuated again to return the cam to the resting position.

16. The method of claim 15, wherein the first button comprises a flexible material configured to bend when pressed, and wherein actuating the first button comprises applying pressure to an engagement position on an outer surface of the first button such that the flexible material bends and causes an inner surface of the first button to actuate the second button without requiring continuous pressing from the user.

17. The method of claim 15, comprising toggling the second button to remain in position when actuated by the first button, wherein the toggling switches the second button between two preset positions to control actuation of the servo motor and rotation of the cam.

18. The method of claim 15, comprising securing the fuel pump assistance device in position via interaction between a back cover and a housing of the fuel pump assistance device, wherein the back cover comprises an elongated portion with a spacer and a lip that creates a structural support to prevent the fuel pump assistance device from rotating about an axle when the cam exerts force on the squeeze lever of the gas pump handle.

19. The method of claim 15, wherein rotating the cam comprises rotating the cam 90 degrees from the resting position to the engaged position, and wherein rotating the cam comprises transmitting power from the servo motor through a first gear to a second gear connected to the cam via an axle.

20. The method of claim 15, wherein the rotation of the cam creates a frictional force between the cam and the squeeze lever that retains the fuel pump assistance device on the gas pump handle without requiring the user to hold the fuel pump assistance device, thereby allowing the user to disengage from the fuel pump assistance device while fuel is being pumped.

* * * * *